(12) United States Patent
Takafuji et al.

(10) Patent No.: US 6,832,145 B2
(45) Date of Patent: Dec. 14, 2004

(54) PEDESTRIAN COLLISION PROTECTION SYSTEM AND COLLISION SITE DETECTING APPARATUS FOR USE IN VEHICLE

(75) Inventors: Tetsuya Takafuji, Anjo (JP); Yoshiyuki Hattori, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/667,440

(22) Filed: Sep. 23, 2003

(65) Prior Publication Data

US 2004/0064230 A1 Apr. 1, 2004

(30) Foreign Application Priority Data

Sep. 24, 2002 (JP) ........................................ 2002-277908
Dec. 10, 2002 (JP) ........................................ 2002-358270

(51) Int. Cl.$^7$ ................................................ G06F 7/00
(52) U.S. Cl. ........................ 701/45; 701/301; 340/436; 340/903; 180/271
(58) Field of Search ........................... 701/45, 46, 300, 701/301; 340/435, 436, 903; 180/271, 274; 280/734, 735

(56) References Cited

U.S. PATENT DOCUMENTS 4,249,632 A * 2/1981 Lucchini et al. ............ 180/274
6,561,301 B1 * 5/2003 Hattori et al. ............... 180/274
2004/0066286 A1 * 4/2004 Stephan et al. .............. 340/436

FOREIGN PATENT DOCUMENTS

| JP | 8-216826 | 8/1996 |
| JP | 11-28994 | 2/1999 |
| JP | 11-310095 | 11/1999 |
| JP | 3212841 | 7/2001 |
| JP | 2002-36994 | 2/2002 |

* cited by examiner

Primary Examiner—Gertrude A. Jeanglaude
(74) Attorney, Agent, or Firm—Posz & Bethards, PLC

(57) ABSTRACT

Provided is a collision position detecting apparatus for a vehicle, comprising a line sensor including first and second conductive lines fixedly secured onto a front surface or rear surface of the vehicle to extend in lateral directions of the vehicle and placed to be separated from each other by a predetermined spacing in longitudinal directions of the vehicle, with at least one of the conductive lines being elastically deformed at a position of a collision against a body to be restorable to make an electrical connection with the other conductive line. The apparatus simultaneously detects a collision against a pedestrian and the position of the collision on the basis of a current flowing in the conductive lines or a voltage drop therein. This can specify the collision position quickly and facilitate the manufacturing of the apparatus.

15 Claims, 16 Drawing Sheets

FIG. 6
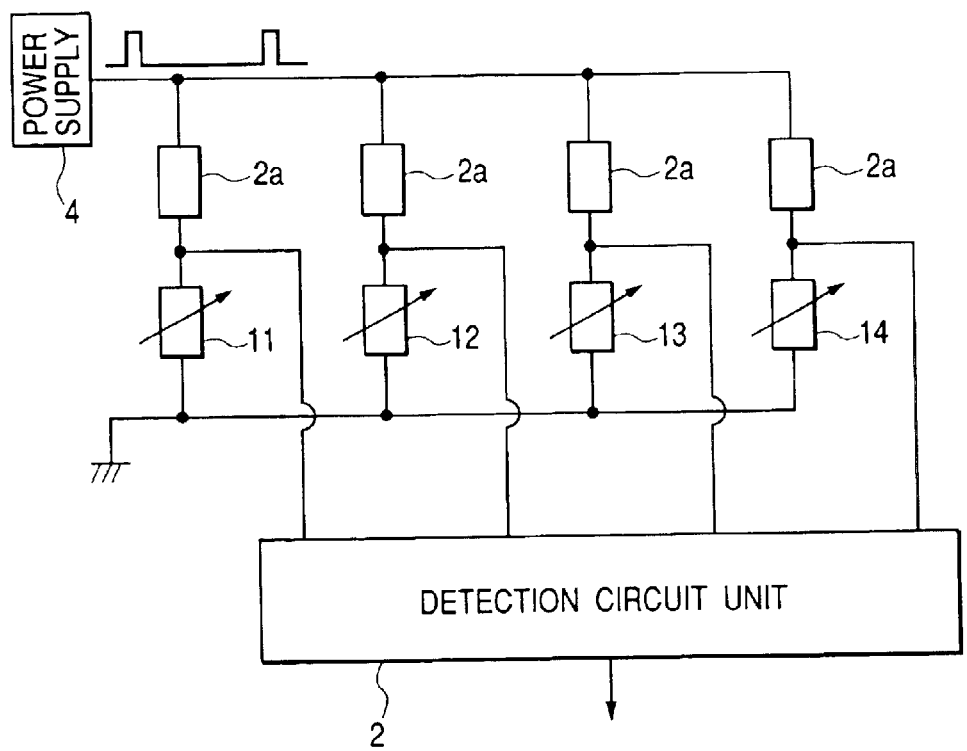
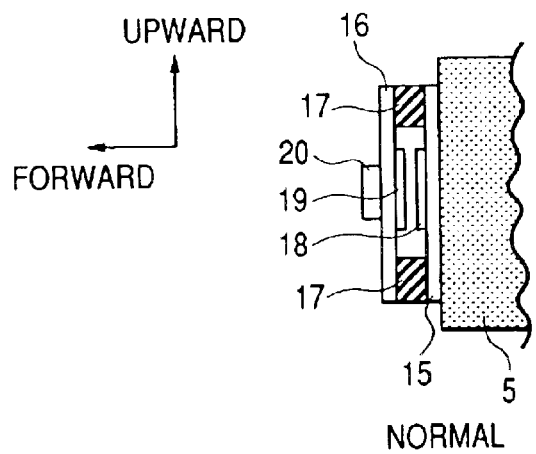
FIG. 7A
NORMAL
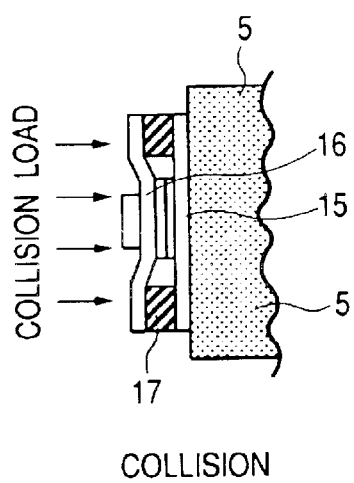
FIG. 7B
COLLISION

NORMAL

COLLISION

PEDESTRIAN COLLISION PROTECTION SYSTEM AND COLLISION SITE DETECTING APPARATUS FOR USE IN VEHICLE

BACKGROUND OF THE INVENTION

1) Field of the Invention

The present invention relates to a pedestrian collision protection system for a vehicle, and to a collision site (position) detecting apparatus suitable for use in the pedestrian collision protection system.

2) Description of the Related Art

So far, there has been proposed a pedestrian collision protection apparatus for a vehicle in which a pedestrian collision detecting apparatus (which will hereinafter be referred to equally as a "bumper sensor") is placed on a front bumper of a vehicle to detect a collision with a pedestrian so that, if this detecting apparatus has detected a collision of the vehicle with a pedestrian when the vehicle is in a traveling condition, an air bag provided at an upper surface of a front portion of the vehicle, or the like, is activated to alleviate the impact to be made on the pedestrian who collapses onto the upper surface of the front portion of the vehicle.

As one example of the pedestrian collision protection system, Japanese Patent No. 3212841 discloses a technique in which, in addition to the aforesaid bumper sensor (collision detecting element), a laser light emitting/receiving device (collision site detecting element) is provided to monitor a space above a front portion of a vehicle and an upper surface of the vehicle front portion is divided into a plurality of areas and an air bag (pedestrian protecting element) is provided in each of the areas.

The laser light emitting/receiving device is made to emit laser beams from right and left sides of a front portion of a vehicle toward a pedestrian collapsing onto the space above the vehicle front portion to, on the basis of reflected light therefrom, make a decision as to whether the pedestrian falls into the right side or left side of the upper surface of the vehicle front portion. This enables only an air bag in the falling-into-side to be spread, thus achieving the size reduction of the air bag.

The concrete examples of the bumper sensor (collision detecting element) are disclosed in Japanese Patent Laid-Open Nos. HEI 8-216826 and HEI 11-310095. The bumper sensor disclosed in the former document is constructed in a manner such that electrodes are placed on both sides of an electric conductive rubber containing a metallic conductive fine-grain and is formed into an elongated configuration to securely detect a collision of a pedestrian even where the pedestrian collides in a front bumper. The bumper sensor disclosed in the latter document includes a pressure sensor for sensing an internal pressure of an elastic tube filled with a gas and is made to detect a collision against a pedestrian on the basis of a rise of the internal pressure of the elastic tube.

The pedestrian collision protection system disclosed in Japanese Patent No. 3212841 is capable of making a decision on a site (position in right- and left-hand directions) of a collision against a pedestrian and, hence, enables the size reduction of an air bag to be spread. In consequence, it is possible to quickly operate an impact buffering device, such as spreading an air bag, with a less application force, which is advantageous in practical use.

However, this pedestrian collision protection system can detect a collision itself through the use of the bumper sensor but creating problems in that 1) difficulty is encountered in making a decision on a collision site with a pedestrian until one of or both the right- and left-side laser light emitting/receiving devices for the pedestrian collision site detection detects the pedestrian falling into a space above a front portion of the vehicle and, hence, the time from when the collision site is confirmed until the spreading of an air bag becomes short, 2) if intensive sunlight is incident on the light-receiving portion of the laser light emitting/receiving device, the incident light quantity exceeds its input dynamic range to make it difficult to detect a pedestrian forming an object of optical reflection, 3) the equipment cost becomes high because a pair of laser light emitting/receiving devices are required for monitoring the object of optical reflection above the vehicle front portion, and 4) the detection accuracy drops due to dirt and damage to lens surfaces. For these reasons, it is difficult to put it in practical use.

The bumper sensor disclosed in Japanese Paten Laid-Open No. HEI 8-216826 has a structure in which an electric conductive rubber containing a metallic conductive fine-grain is interposed between a pair of electrodes and is made to detect a collision against a pedestrian through the use of the phenomenon in which the electric resistance value between both the electrodes lowers when the electric conductive rubber is compressed by the collision. However, since there is a need for the bumper sensor to detect a collision against a pedestrian irrespective of the collision position in lateral directions of the vehicle, the total electrode area becomes naturally large. Meanwhile, in the case of such a conductive grain dispersed rubber, difficulty is encountered in easily reducing the direct-current leakage at non-collision. Considering the large electrode area, the direct-current loss becomes considerably large.

Moreover, in the case of the bumper sensor disclosed in Japanese Paten Laid-Open No. HEI 11-310095, difficulty is experienced in maintaining the internal pressure of the elastic tube, and a delay in activation of an air bag occurs due to a delay in detection stemming from a pressure propagation time in the interior of the tube.

Accordingly, the conventional pedestrian collision protection systems require, in addition to the bumper sensor (a sensor fixedly secured onto a front bumper) for detecting a collision against a pedestrian to recognize a collision site in right- and left-hand directions (lateral directions) of a vehicle, the additional use of a sensor for specifying the collision site in the lateral directions and, hence, there is a need to considerably reduce the manufacturing cost and solve the detection delay problem.

Meanwhile, in the case of conventional collision detecting apparatus, even if the detection of a collision is feasible, difficulty is encountered in distinguishing between a pedestrian and an object of collision other than the pedestrian. In order to avoid useless activation of a pedestrian protecting device such as an air bag, it is preferable to activate the pedestrian protecting device after the confirmation that the object of collision is a pedestrian.

As methods of making a decision as to whether an object of collision is a pedestrian, there have been known techniques proposed in Japanese Patent Laid-Open Nos. HEI 11-028994 and HEI 11-310095. Japanese Patent Laid-Open No. HEI 11-028994 discloses the technique using a collision load (or deformation quantity), a duration thereof and a vehicle speed, while Japanese Patent Laid-Open No. HEI 11-310095 discloses the technique using a deformation quantity at a collision, its variation with time and a vehicle speed.

That is, these decision technique utilize the phenomenon in which, when a collision against a pedestrian occurs, a leg portion of the pedestrian is thrown up or dashed off after the collision. Concretely, a leg portion thereof departs from a bumper after the collision and, for this reason, the magnitude of a load or deformation quantity, to be detected by a sensor, attenuates after the collision against the vehicle. A decision on a pedestrian is made through the use of this phenomenon.

However, the pedestrian decision techniques disclosed in these documents encounter a problem in that the time for which a collision load or a deformation quantity exceeds a threshold (which will hereinafter be referred to as equally to a "collision detection duration") varies diversely in accordance with a state of a leg portion of a pedestrian.

That is, in a case in which a vehicle speed is approximately 40 km/h, the time from which only one leg collides against a bumper until it is thrown up, or the time until both legs are thrown up by a bumper when both legs of a pedestrian are in place (are put in order) in a vehicle advancing direction, are approximately 10 to 20 ms. In the latter case, since the leg portion first thrown up by the bumper biases the other leg portion adjacent thereto, the collision detection duration does not show a large difference from that in the case in which only one leg colliding against the bumper.

However, in most cases of collision against a pedestrian, both leg portions of the pedestrian are not in place with respect to a bumper, and the distance between on leg portion and the bumper and the distance between the other leg portion and the bumper provide a difference which affects the aforesaid collision detection duration and, in consequence, in this case, the time from which both leg portions are thrown up until a collision load or a deformation quantity falls below a threshold (that is, the end of the collision detection duration) becomes considerably longer as compared with the case in which only one leg portion or both leg portions being in place in a vehicle advancing direction are thrown up. That is, the time needed for the pedestrian decision is prolonged and the time taken for the apparatus operation becomes shorter, which makes the apparatus operation difficult.

SUMMARY OF THE INVENTION

The present invention has been developed with a view to eliminating the above-mentioned problems, and it is therefore an object of the present invention to provide a pedestrian collision protection system for a vehicle and collision site detecting apparatus suitable for use in the pedestrian collision protection system, which can provide easy manufacturing and can quickly specify the pedestrian collision side in the lateral directions.

For this purpose, in accordance with an aspect of the present invention, there is provided a pedestrian collision protection system for a vehicle, comprising a collision detecting element fixedly secured to a bumper of a vehicle for detecting a collision against a pedestrian, a collision site detecting element for detecting a position of a collision site in lateral directions, and a pedestrian protecting element provided in the vehicle for protecting the pedestrian from the collision according to the pedestrian collision site in the lateral directions at the collision against the pedestrian on the basis of outputs of the pedestrian collision detecting element and the pedestrian collision site detecting element, wherein the collision detecting element also functions as the collision site detecting element and includes a line sensor composed of a plurality of conductive lines which are separated from each other by a predetermined spacing to confront each other and come into contact with each other when the collision against the pedestrian occurs, and a detection circuit unit made to detect the collision detection and the collision site detection on the basis of a variation of electric energy (quantity of electricity) related to an impedance between the plurality of conductive lines.

In this pedestrian collision protection system for a vehicle, when a pedestrian collides with the line sensor disposed in longitudinal directions of the bumper, the plurality of conductive lines constituting the line sensor are locally deformed to come into contact with each other. Therefore, the detection of the occurrence of a collision against a pedestrian and the specification of the pedestrian collision site are accomplished by making a decision as to the resultant impedance variation between the conductive lines.

This can considerably simplify the system configuration as compared with such conventional systems and achieve the size and weight reduction of a portion of the pedestrian protecting element, operating in response to a collision, while preventing the delay in activation or operation of the pedestrian protecting element by specifying a pedestrian collision site.

Incidentally, the aforesaid contact is sufficient if it causes a detectable impedance variation between the conductive lines, and for the impedance variation, for example, a direct-current voltage or an alternating-current voltage may be applied through a resistive element for detection of a voltage drop to between the conductive lines to detect a voltage drop across the voltage drop detection resistive element.

In a preferred mode, the aforesaid line sensor includes a plurality of pairs of conductive lines successively arranged in a longitudinal direction of the bumper to detect the collision with the pedestrian independently of each other, and the detection circuit unit makes a decision indicative of the occurrence of the collision when detecting that at least two conductive lines constituting the conductive line pair are brought into contact with each other due to the collision, and makes a decision on the collision site on the basis of the location of the contact-made conductive line pair which have come into contact with each other.

This simple construction that involves locating the conductive lines at different positions in lateral directions of the vehicle can easily and accurately achieve the collision detection and the collision site detection simultaneously.

In a preferred mode, the aforesaid line sensor includes a pair of conductive lines placed to extend in a longitudinal direction of the bumper and confront each other in a state separated from each other by a predetermined spacing and made to come locally into contact with each other at a position of the collision with the pedestrian and its vicinities (a region near the collision position), and at least one of the conductive lines constituting the conductive line pair includes a resistive (resistor) line having a resistivity (specific resistance) in a numerical range which allows the detection of the current or voltage drop according to the occurrence or non-occurrence of the contact therebetween, and the detection circuit unit detects the collision and the collision site in the lateral directions on the basis of the current flowing in the conductive line pair or the voltage drop in the conductive line pair.

Thus, at least a pair of conductive lines are short-circuited (brought into contact with each other) at a collision site and, hence, the impedance varies between the conductive lines when viewed from a given portion of these conductive lines, for example, end portions thereof. This can realize the detection of the collision and the collision site in the lateral directions through the use of a small number of conductive lines.

In a preferred mode, the conductive line pair is composed of an electrode line made of a high-conductivity material and a resistive line made of a resistive material having a predetermined resistivity.

This permits the employment of a low-priced material, such as an aluminum plate or an aluminum film, for a portion of the conductive line, thereby leading to the reduction of the manufacturing cost.

In a preferred mode, the line sensor is fixedly secured to a portion of the bumper which protrudes most on an outside surface of the bumper.

This enables a high-sensitivity detection of the contact with a pedestrian, for that the pedestrian first comes into contact with the line sensor. In this connection, since the line sensor can be deformed together with the bumper, it is also possible that the line sensor is put in a groove made in the bumper or that the line sensor is formed integrally with the bumper.

In a preferred mode, the line sensor is fixedly secured to an inside surface of the bumper.

This enables the line sensor to be covered with the bumper, thus avoiding damaging the beauties.

In a preferred mode, one of the conductive lines is held by the other conductive line or the bumper in a state where an elastic member having an electrical insulating property is interposed therebetween.

This enables the conductive line to be easily restored to the original position after the detection of a collision.

In a preferred mode, one of the conductive lines has an elasticity whereby the conductive line is restorable to the original position and is locally deformed by the collision, and is held by the other conductive line or the bumper.

This can eliminate the need for the employment of the above-mentioned elastic member, thus leading to simplifying the manufacturing process.

In a preferred mode, a power supply source applies a supply voltage through a voltage drop detection resistive element to between the same-side end portions of the pair of conductive lines constituting the conductive line pair, and the detection circuit unit carries out the detection of the occurrence of the collision and the specification of the collision site on the basis of a voltage drop across the voltage drop detection resistive element.

This enables the high-sensitivity detection of the collision site.

In a preferred mode, the electrode line is connected to a first predetermined electric potential source and both ends of the resistive line are connected through different voltage drop detection resistive elements to a second predetermined electric potential source, and the detection circuit unit makes a decision on the collision site on the basis of voltage drops across the voltage drop detection resistive elements.

In this case, since the voltage of the electrode line is generally ignorable, the first voltage drop detection resistive element can secure a high detection sensitivity at one end side of the conductive line pair and the second voltage drop detection resistive element can secure a high detection sensitivity at the other end side of the conductive line pair. Thus, a high detection sensitivity providing a high linearity is obtainable at both end portions in the lateral directions with which a pedestrian tends to come into contact in such a manner as to detect the difference in voltage drop between both the voltage drop detection resistive elements.

In addition, in accordance with another aspect of the present invention, there is provided a collision position detecting apparatus suitable for use in the aforesaid pedestrian collision protection system, comprising a line sensor including at least two conductive lines fixedly secured to a front surface or rear surface of a vehicle and placed to extend in lateral directions of the vehicle in a state separated from each other by a predetermined spacing, and a detection circuit unit for detecting an electric energy related to an impedance between the predetermined positions of both the conductive lines, wherein at least one of both the conductive lines is made of a resistive material having a predetermined resistivity, and when a collision occurs, the spacing between both the conductive lines is locally elastically reduced at a position of the collision and its vicinities so as to be restorable, and the impedance varies according to the collision position.

That is, in this collision position detecting apparatus, at least two conductive lines, one of which has an electrical resistance to provide a resistive line, are provided on a front surface or rear surface of a vehicle to extend in lateral directions of the vehicle, and when a collision against a person or a collision against a thing occurs, the spacing between both the conductive lines is locally shortened so that they are brought into contact with each other. This enable the impedance between both the conductive lines viewed from predetermined positions of both the conductive lines to vary in accordance with a variation of the collision site. The impedance variation is easily detectable through the use of a well-known technique using a current variation, voltage variation, oscillating frequency variation, or the like, which permits the detection of a collision site through the use of a simple apparatus configuration and, simultaneously, the detection of the occurrence of a collision. If the collision site is quickly detectable at the occurrence of a collision, optimum collision-handling processing is achievable, such as spreading only suitable one of a plurality of air bags for the pedestrian protection placed in the exterior of the vehicle. This is advantageous in safety. Incidentally, as a substitute for a conductive line having no electrical resistance, i.e., an electrode line, it is also possible to use a vehicle body.

In a preferred mode, an alternating-current voltage and a direct-current voltage are applied to the line sensor, and the detection circuit unit makes at least the collision detection and the collision site detection on the basis of a variation of electric energy related to a direct current component flowing in the line sensor and detects approach of an obstacle on the basis of a variation of electric energy related to an alternating current component flowing in the line sensor.

In this case, as the direct-current voltage, any voltage is employable provided that it is separable in frequency with respect to the alternating-current voltage. For example, as the direct-current voltage, it is also possible to use an alternating-current voltage having a frequency lower than that of the aforesaid alternating-current voltage.

When a pedestrian, considered virtually as a large-capacity conductor or a capacitor whose one end is substantially grounded, approaches the conductive lines of the line sensor, an alternating-current component flows from the conductive lines toward the pedestrian side. Therefore, a signal representative of a collision-unavoidable condition is detectable prior to a collision against the pedestrian. Following this, if the collision occurs, the collision detection and the collision site detection are carried out as mentioned above. Accordingly, proper countermeasures can be taken prior to the collision.

Moreover, in a case in which a pedestrian or the like is considered as a capacitor having one end substantially installed, when a pedestrian approaches a predetermined position of a resistive line, the alternating-current impedance of the line sensor varies, and a real value (resistance) component and an imaginary value (capacity) component, constituting the alternating-current impedance, can easily be separated from each other. Therefore, it is also possible to estimate a collision site on the basis of a variation of the real value (resistance) component prior to the actual occurrence of the collision.

Furthermore, in accordance with a further aspect of the present invention, there is provided a collision position detecting apparatus for a vehicle, comprising a line sensor including first and second conductive lines fixedly secured onto a front surface or rear surface of the vehicle to extend in lateral directions of the vehicle and placed to be separated from each other by a predetermined spacing in longitudinal directions of the vehicle, with at least one of the conductive lines being elastically deformed at a position of a collision against a body to be restorable to make an electrical connection with the other conductive line, a power supply source for applying a voltage to a predetermined position of the first conductive line, a pair of voltage drop detection resistive elements individually connected between both end portions of the second conductive line and a predetermined constant-potential source, and a collision position detection circuit unit for discriminating a collision position obtained on the basis of voltage drops across both the resistive elements through the use of an n-bit digital signal, wherein, when an electrical resistance value per unit distance of the first conductive line in the lateral directions is taken as R1, an electrical resistance value per unit distance of the second conductive line in the lateral directions is taken as R2, an electrical resistance value of both the resistive elements is taken as R3, R3/R1 is expressed as S, a constant (required resolution/sensor installation width) is taken as dx, and a maximum allowable resistance ratio is taken as T, a resistance ratio (R2/R1) is set to be below T given by the following equation (1).

$$0 < \frac{R2}{R1} < \frac{(dx+S)\{2^n dxS - (1-dx) - 2S - S^2\}}{(1+2^nS)(1+2S)dx} = T \quad (1)$$

$$S = \frac{R3}{R1}$$

where dx: required resolution/sensor installation width
n: voltage read resolution multiplier (number of bits)

That is, when a pedestrian collides against a line sensor comprising a pair of conductive lines disposed in longitudinal directions of a bumper, the conductive lines are elastically deformed to come into contact with each other, and the collision position is detected on the basis of a variation of the electrical resistances of the conductive lines. In more details, a constant voltage is applied to one end of the first conductive line while both the ends of the second conductive line are grounded through resistive elements so that the collision position is detected on the basis of the voltage drops of the resistive elements at the collision. For example, in a case in which this vehicle collision position detecting apparatus is employed for a pedestrian collision decision, in the case of a collision with a pedestrian, if one leg of the pedestrian is thrown up while the other leg remains in a colliding condition, the collision position varies. Therefore, the pedestrian collision decision can be made by the detection of this collision position variation.

In a line sensor made to detect a collision position on the basis of a voltage drop of a resistive element, when an electrical resistance from a collision position of a conductive line to an end portion thereof is taken as R1, an electrical resistance of a resistive element connected to this end portion is taken as RC, a power supply voltage is taken as V, a unit distance variation in collision position is taken as $\Delta X$ and a variation of a voltage drop V1 for the unit distance variation is taken as $\Delta V1$, a voltage drop V1 across the resistive element is given by V1=(RC/(RC+R1))V, and a voltage drop variation $\Delta V1/\Delta X$ per unit distance variation in collision position becomes large at a central portion of the conductive line in lateral directions of a vehicle but becoming small at both end portions in the lateral directions, thus degrading the detection accuracy.

For this reason, according to the present invention, the resistance ratio (R2/R1) of the conductive lines is set to be below the value given by the aforesaid equation (1). This enables a variation $\Delta V1/\Delta X$ of the voltage drop per unit distance variation in collision position to be maintained at over a value needed for the required resolution and enables the detection accuracy to be maintained at a required level even at both the end portions of the conductive line in the lateral directions.

In a preferred mode, when a contact resistance of both the conductive lines at a collision is taken as Rc and Rc/R1 is expressed as C, a resistance ratio (R2/R1) of the conductive lines is set to be below T' given by the following equation (2). This can secure a required detection level even if the contact resistance thereof is high.

$$0 < \frac{R2}{R1} < \frac{F(S) + G(S)}{H(S)} = T' \quad (2)$$

$$F(S) = 2^n S[(dx+S)\{(1+S)S+(1+2S)C\} - S\{(dx+S)(1-dx+S)+(1+2S)C\}]$$

$$G(S) = -\{S(1+S)+C(1+2S)\}\{(dx+S)(1-dx+S)+(1+2S)C\}$$

$$H(S) = \{S(1+2^nS)+C(1+2S)\}(1+2S)dx$$

$$S = \frac{R3}{R1}$$

$$C = \frac{Rc}{R1}$$

where dx: required resolution/sensor installation width
n: voltage read resolution multiplier (number of bits)

In addition, in accordance with a further aspect of the present invention, there is provided a pedestrian collision detecting apparatus for a vehicle, comprising a line sensor including first and second conductive lines fixedly secured onto a front surface or rear surface of the vehicle to extend in lateral directions of the vehicle and placed to be separated from each other by a predetermined spacing in longitudinal directions of the vehicle, with at least one of the conductive lines being elastically deformed at a position of a collision against a body to be restorable to make an electrical connection with the other conductive line, a power supply source for applying a voltage to a predetermined position of the first conductive line, constant current circuit units individually connected between end portions of the second conductive line and a predetermined constant-potential source, and a collision position detection circuit unit for determining a collision position on the basis of voltage drops across the constant current circuit units.

This can make constant a variation $\Delta V1/\Delta X$ of the voltage drop per unit distance variation in collision position at each parts in lengthwise directions of the conductive lines, thus providing high detection accuracy.

In a preferred mode, the collision position detection circuit unit detects the collision position on the basis of a difference in voltage drop between the pair of constant current circuit units individually placed between both the end portions of the second conductive line and the predetermined constant-potential source. This can eliminate the degradation of the detection accuracy stemming from a variation of the contact resistance of the pair of conductive lines, thus realizing satisfactory collision position detection accuracy.

BRIEF DESCRIPTION OF THE DRAWINGS

Other objects and features of the present invention will become more readily apparent from the following detailed description of the preferred embodiments taken in conjunction with the accompanying drawings in which:

FIG. 6 is an illustration of an equivalent circuit of the line sensor shown in FIG. 5;

FIG. 7A is a vertical cross-sectional view illustratively showing a normal state in one example of the line sensor shown in FIG. 1;

FIG. 7B is a vertical cross-sectional view illustratively showing a collision state in the one example of the line sensor shown in FIG. 1;

DESCRIPTION OF THE PREFERRED EMBODIMENTS

Embodiments of the present invention will be described hereinbelow with reference to the drawings.

(First Embodiment)

Figure 1:
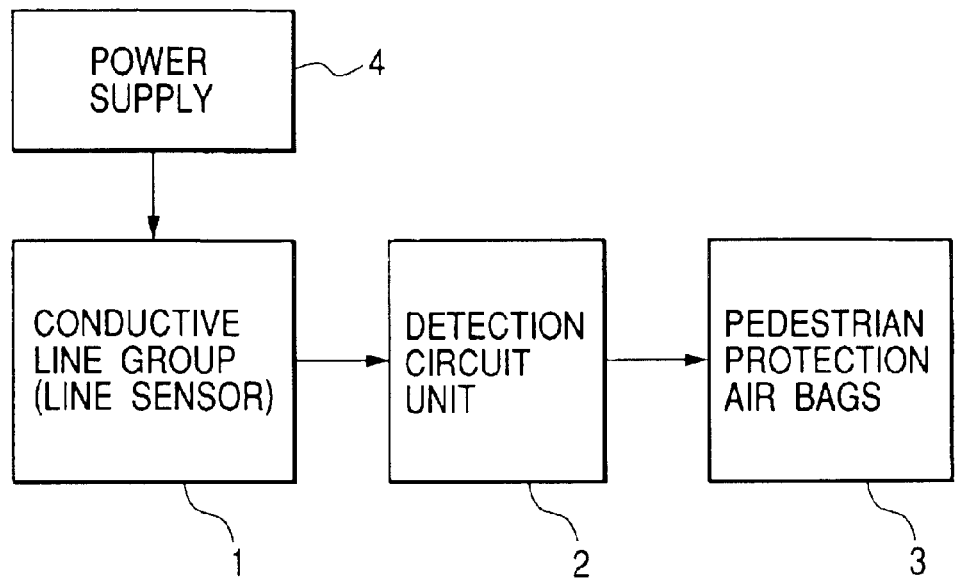
FIG. 1 is a block diagram showing a pedestrian collision protection system for a vehicle according to a first embodiment of the present invention.
Figure 2:
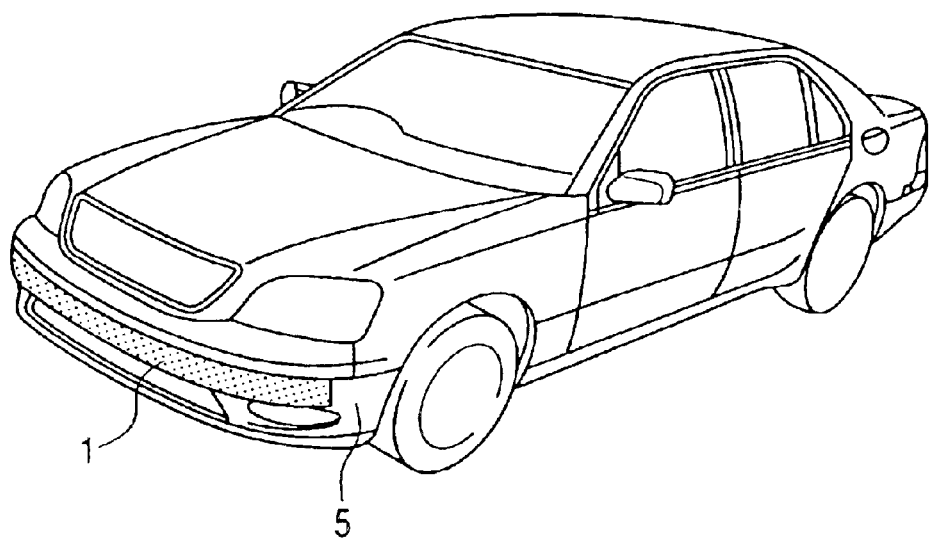
FIG. 2 is a perspective view illustratively showing a location of a line sensor shown in FIG. 1.

FIG. 1 is a block diagram showing a configuration of a pedestrian collision protection system for a vehicle according to a first embodiment of the present invention, and FIG. 2 is a perspective view showing a mounted state of a line sensor, shown in FIG. 1, in a vehicle.

In FIG. 1, the pedestrian collision protection system is made up of a line sensor 1 comprising a plurality of conductive lines, a detection circuit unit for carrying out collision detection and collision side detection on the basis of a signal outputted from the line sensor 1, a plurality of air bags (pedestrian protecting element) 3 provided on an upper surface of a front portion of the vehicle, and a power supply source 4 for supplying power to the line sensor 1 and the detection circuit unit 2.

Figure 3:
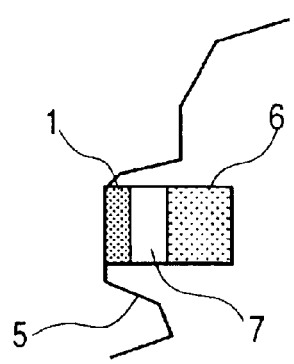
FIG. 3 is a vertical cross-sectional view illustratively showing an example of location of the line sensor shown in FIG. 1.
Figure 4:
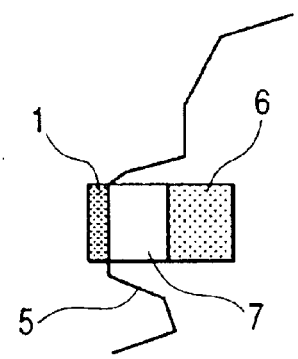
FIG. 4 is a vertical cross-sectional view illustratively showing another example of location of the line sensor shown in FIG. 1.
Figure 5:
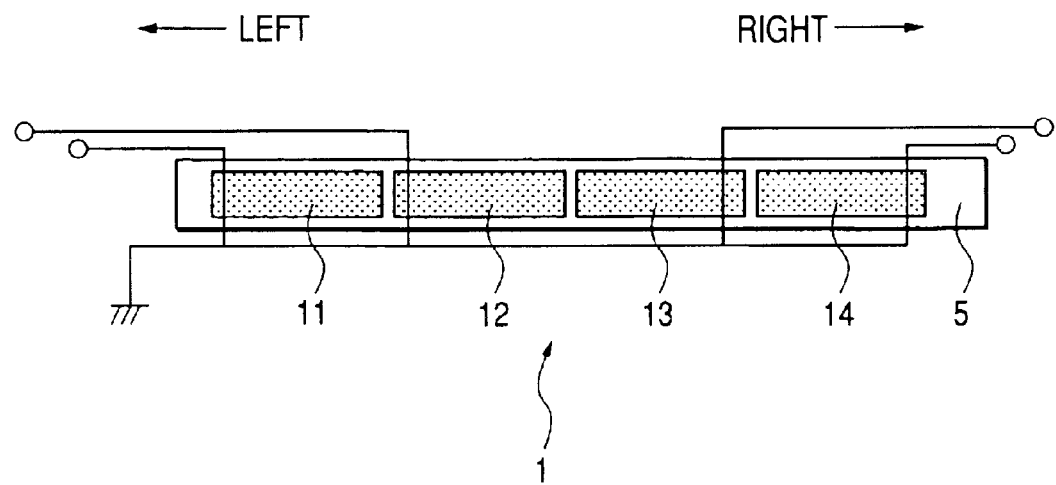
FIG. 5 is a front elevational view illustratively showing an example of construction of the line sensor shown in FIG. 1.

The line sensor 1 is adhered onto a bumper cover 5 forming a front bumper of the vehicle as shown in FIG. 2. The line sensor 1 is composed of a tape-like pressure-sensitive type variable resistor (which will hereinafter be referred to equally as a "pressure-sensitive film") formed to extend in lateral directions (right- and left-hand directions) of the vehicle. As well known, this pressure-sensitive film 1 is made by adhering conductive films having a non-resistance property onto both surfaces of an elastic film such as a conductive rubber in which carbon or the like is dispersed. The line sensor 1 can be fixedly secured to a front surface of a bumper cover 5 as shown in FIG. 5, and it can also be fixedly secured onto a rear surface of the bumper cover 5 as shown in FIG. 4. In FIGS. 3 and 4, numeral 6 represents a bumper reinforce and numeral 7 denotes an urethane-foam-made cushioning member adhered to a front surface of the bumper reinforce 6.

Referring to FIG. 5, a description will be given hereinbelow of a structure of the line sensor 1 according to this embodiment.

This line sensor 1 is composed of four pressure-sensitive films 11 to 14 successively adhered onto a front surface of the bumper cover 5 in lateral directions. Each of the pressure-sensitive films 11 to 14 includes a pair of conductive films between which a conductive rubber resides as mentioned above. FIG. 6 is an illustration of an equivalent circuit of this line sensor. As FIG. 6 shows, one of a pair of conductive films of each of the pressure-sensitive films 11 to 14 is grounded, while a high supply potential (voltage) is applied through a resistive element 2a to the other.

When a pedestrian collides against any one of the pressure-sensitive films 11 to 14, the electrical resistance of only the pressure-sensitive film which has been involved in the collision drops considerably, and the voltage drop decreases. Therefore, the detection circuit unit 2 can easily specify the collision side (collision position). Moreover, at the same time, this drop of the electrical resistance of the pressure-sensitive film signifies the occurrence of the collision, and when making a decision that the voltage drop of at least one pressure-sensitive film falls below a predetermined level, the detection circuit unit 2 immediately activates only the air bag at the corresponding site. Incidentally, in FIG. 6, it is also possible to use the resistive element 2a as a constant current source. In addition, in order to reduce the DC power loss in the pressure-sensitive films 11 to 14, an interval energizing operation, such as making current supply for 1 msec at an interval of 10 msec, is conducted to reduce the power dissipation. Still additionally, it is also possible to interchange the ground potential and the high supply potential.

(First Modification)

As the line sensor 1, in place of the above-mentioned pressure-sensitive films, it is also appropriate to use the elastic deformation of two conductive plates (conductive lines) confronting each other in a state separated from each other by a predetermined spacing. One example of the conductive plate elastic deformation type line sensor will be described hereinbelow with reference to FIGS. 7A and 7B.

In FIGS. 7A and 7B, the line sensor 1 includes four switch plates corresponding to the pressure-sensitive films 11 to 14, and each of the switch plates is composed of conductive plates 15, 16, a spacer 17, contactors 18, 19 and a rib 20. The conductive plate 15 is fixedly secured to the bumper cover 5 while the conductive plate 16 is supported by the conductive plate 15 in a state where the spacer 17 having an electrical insulating property is interposed therebetween. Naturally, it is also possible that the conductive plate 16 is directly supported by the bumper cover 5 through the spacer 17.

The conductive plate 16 confronts the conductive plate 15 in a state separated therefrom by a predetermined spacing, and the contactors 18 and 19 are fixed to the conductive plates 15 and 16, respectively, so that they confront each other in a state separated by a short spacing. The conductive plate 16 is made of a metallic material having a good elasticity. FIG. 7A shows a normal state while FIG. 7B illustrates a collision state. When a collision load is applied to the conductive plate 16, the conductive plate 16 is elastically deformed to be dented so that the contactors 18 and 19 are brought into contact with each other and the conductive plates 15 and 16 are short-circuited with each other.

(Second Modification)

Figure 8A:
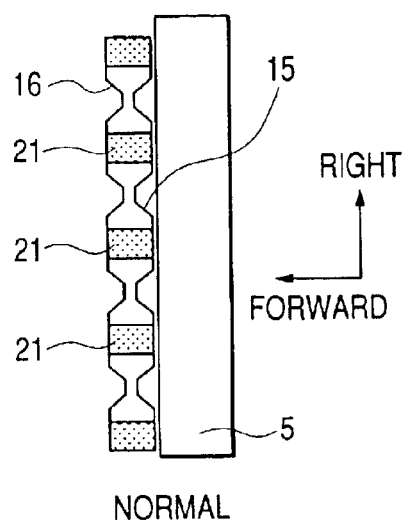
FIG. 8A is a vertical cross-sectional view illustratively showing a normal state in another example of the line sensor shown in FIG. 1.
Figure 8B:
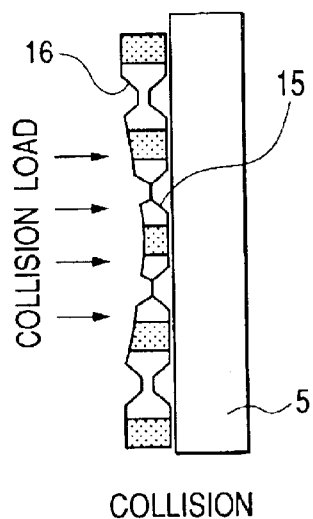
FIG. 8B is a vertical cross-sectional view illustratively showing a collision state in the another example of the line sensor shown in FIG. 1.

Referring to FIGS. 8A and 8B, a description will be given hereinbelow of another example of the conductive plate elastic deformation type line sensor.

In the line sensor 1 shown in FIGS. 8A and 8B, as compared to the line sensor 1 shown in FIGS. 7A and 7B, an elastic insulator 21, such as a rubber, is used in place of the spacer 17 and conductive plates 15 and 16 are bent in directions of approaching each other in place of the employment of the contactors 18 and 19. The rib 20 is omissible. In this case, the elastic characteristic of the conductive plate 16 is allowed to be lower than that of the conductive plate 16 shown in FIGS. 7A and 7B. FIG. 8A shows a normal state while FIG. 8B illustrates a collision state. When a collision load acts on the conductive plate 16, the conductive plate 16 is dented while compressing the elastic insulator 21 so that the conductive plates 15 and 16 are brought into contact with each other and are short-circuited with each other.

(Second Embodiment)

Figure 9:
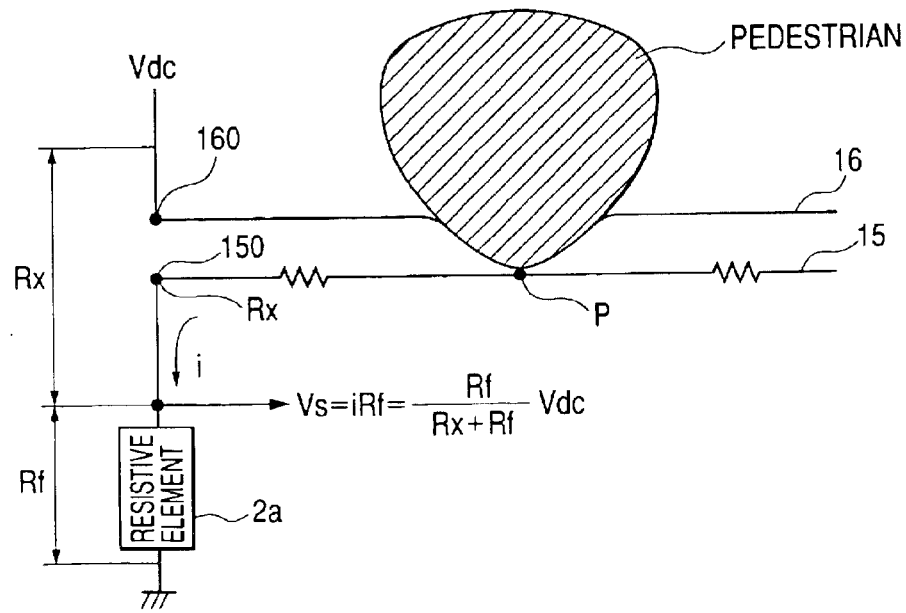
FIG. 9 is an illustration of a circuit arrangement organizing a collision side detecting apparatus according to a second embodiment of the present invention.

Referring to FIG. 9 showing a circuit arrangement, a description will be given hereinbelow of a collision site detecting apparatus for use in a vehicle according to a second embodiment of the present invention.

In FIG. 9, a conductive plate 15 is formed as a resistive line having a predetermined resistivity, while a conductive plate 16 is formed as an electrode line having a high conductivity, such as a copper plate. A high direct-current potential Vdc is applied to one end portion 160 of the conductive plate 16 while one end portion 150 (the other end portion is also acceptable) of the conductive plate 15 is grounded through a resistive element 2a.

With this circuit arrangement, the voltage drop due to the resistive element 2a becomes the product of a current i flowing between the conductive plates 15 and 16 and a resistance rf of the resistive element 2a, and the current i becomes Vdc/(Rx+Rf). Since the resistance of the conductive plate 16 is generally ignorable, the resistance value between the conductive plates 15 and 16 can be considered to be equal to the resistance value of the conductive plate 15 between the one end portion 150 of the conductive plate 15 and a contact point (collision point) P. Accordingly, it is possible to satisfactorily detect the collision site on the basis of the magnitude of the voltage drop Vs.

Incidentally, the application of the high direct-current potential Vdc is not limited to the one end portion 160 of the conductive plate 16, but it is also appropriate that the high direct-current potential Vdc is applied to any position of the conductive plate 16. For example, it can also be applied to both the ends of the conductive plate 16.

(First Modification of Second Embodiment)

Although in the above-described second embodiment one conductive plate 15 is used as an electrode line and the other conductive plate 16 is used as a resistive line, it is also appropriate that both the conductive plates 15 and 16 are used as a resistive line.

(Second Modification of Second Embodiment)

A second modification of the second embodiment will be described hereinbelow with reference to FIG. 10.

Figure 10:
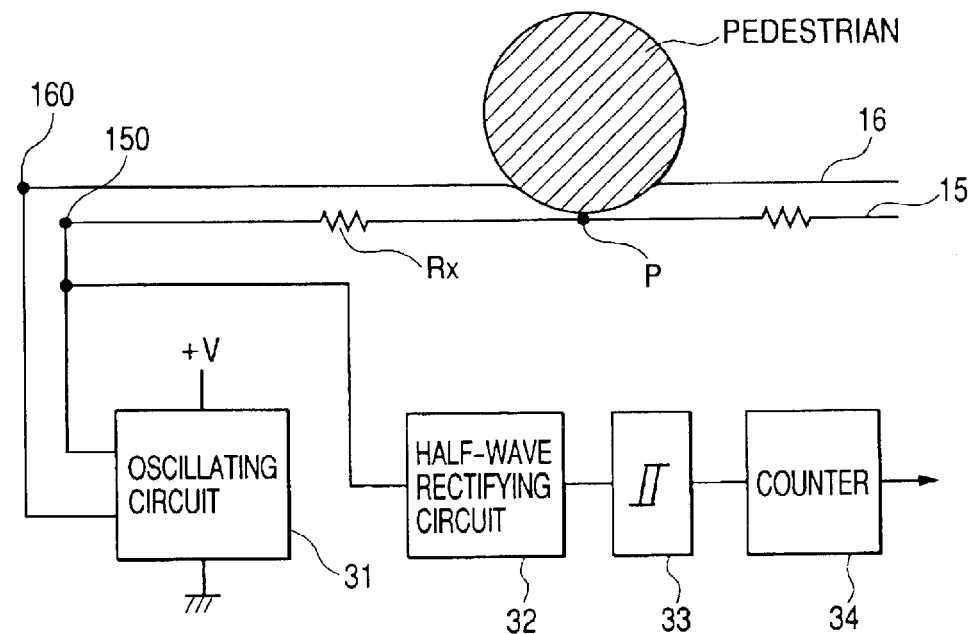
FIG. 10 is a block diagram showing a circuit arrangement according to a modification of the apparatus shown in FIG. 9.

In FIG. 10, this circuit arrangement includes an oscillating circuit 31, a half-wave rectifying circuit 32, a Schmidt trigger circuit 33 and a counter 34.

The oscillating circuit 31 is a RC oscillating circuit whose oscillation frequency varies in accordance with a resistance Rx between both the conductive plates 15 and 16. An oscillation voltage therefrom is detected in the half-wave rectifying circuit 32 and is converted into a pulse signal in the Schmidt trigger circuit 33, with the pulse signal being counted in the counter 34. With this circuit arrangement, the count value of the counter 34 for a predetermined period of time varies in accordance with the displacement of a collision site. Therefore, a decision as to the collision site can be made on the basis of the count value.

(Third Modification of Second Embodiment)

Figure 11:
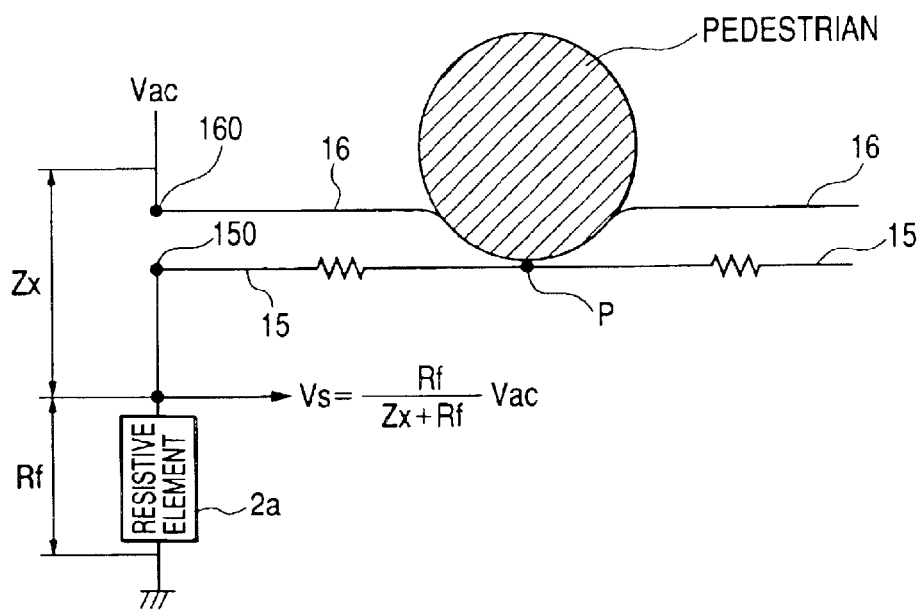
FIG. 11 is an illustration of a circuit arrangement according to a modification of the apparatus shown in FIG. 9.

Referring to FIG. 11, a description will be given hereinbelow of a third modification of the second embodiment.

FIG. 11 shows a circuit arrangement in which, in place of the high direct-current potential Vdc, an alternating-current voltage Vac is applied to both the conductive plates 15 and 16.

In the case of an alternating-current voltage being applied thereto, even if the poor contact between the conductive plates 15 and 16 occurs at a collision side P to increase the contact resistance, since the electrostatic capacity between the conductive plates 15 and 16 at this site becomes extremely large at the occurrence of a collision, an alternating-current contact state is generally obtainable, thereby enabling the detection as in the case of the above-mentioned circuit arrangement.

(Fourth Modification of Second Embodiment)

Figure 12:
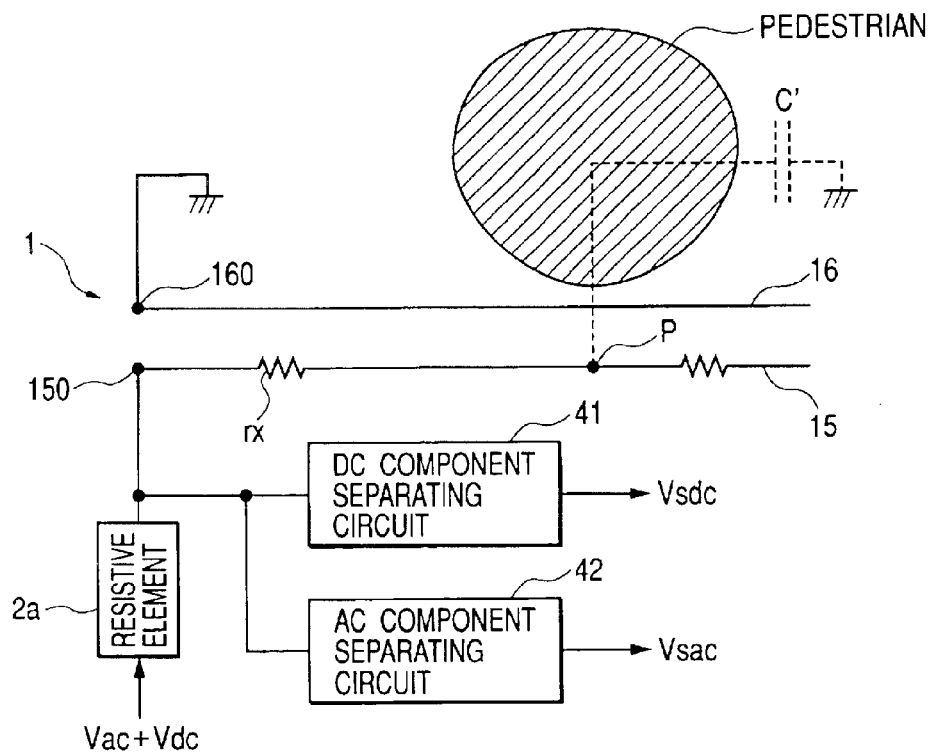
FIG. 12 is an illustration of a circuit arrangement according to a modification of the apparatus shown in FIG. 9.

Referring to FIG. 12, a description will be given hereinbelow of a fourth modification of the second embodiment.

FIG. 12 shows a circuit arrangement in which a high direct-current potential Vdc and an alternating-current voltage Vac are mixed and applied between both the conductive plates 15 and 16. A direct-current component Vsdc of a voltage drop between the conductive plates 15 and 16 constituting the line sensor 1 is separated by a direct-current voltage component separating circuit 41, such as a rectifying circuit or a low-pass filter, while an alternating-current component Vsac is separated by an alternating-current voltage component separating circuit 42 comprising a high-pass filter.

When a pedestrian collides against the line sensor 1 so that the conductive plates 15 and 16 come into contact with each other, as in the case of the circuit arrangement shown in FIG. 9, the collision and the collision site can be detected on the basis of a variation of the direct-current component Vsdc. Moreover, when a pedestrian approaches the line sensor 1, since it can be considered that, in the case of an alternating current, the pedestrian is a capacitor with a large capacity whose one end is grounded, the alternating-current impedance of the line sensor 1 can generally be considered to correspond to a series circuit comprising the resistance Rx and the electrostatic capacity C' of this large-capacity capacitor, and varies in accordance with the degree of approaching of the pedestrian.

Therefore, if a high-frequency alternating-current component of the voltage drop of the line sensor 1 is separated by the alternating-current voltage component separating circuit 42, the approaching of the pedestrian can be detected on the basis of the variation of the high-frequency alternating-current component.

(Fifth Modification of Second Embodiment)

Figure 13:
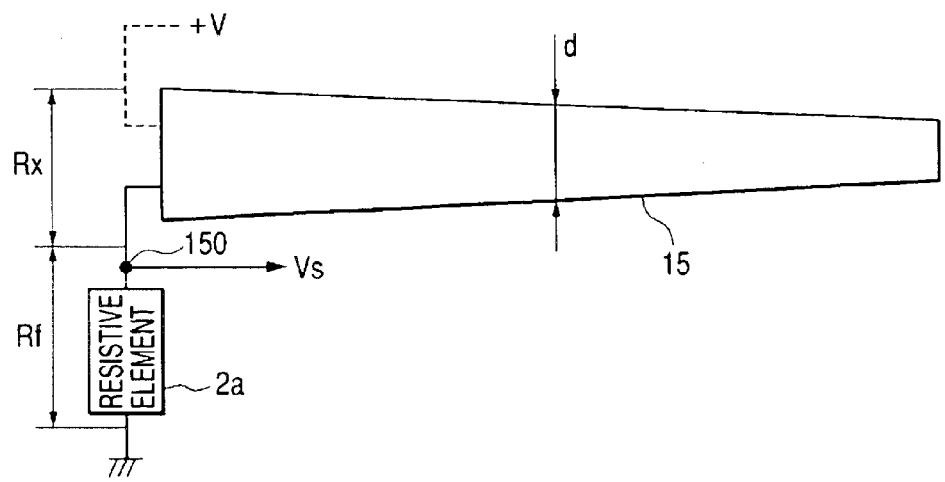
FIG. 13 is an illustration of a circuit arrangement according to a modification of the apparatus shown in FIG. 9.

Referring to FIG. 13, a description will be given hereinbelow of a fifth modification of the second embodiment.

As shown in FIG. 13, as compared to the configuration shown in FIG. 9, in this fifth modification, the width of the conductive plate 15 forming a resistive line is reduced gradually as the position of the conductive plate 15 goes away from the one end 150. In other words, the width of the conductive plate 15 becomes gradually greater in a direction of approaching the one end 150. Although the configuration shown in FIG. 9 has the disadvantage of the rate of change of the signal voltage Vs decreasing as the collision site P departs from the one end 150, the fifth modification can eliminate this disadvantage.

Although it is preferable that the reduction of the width of the resistive line is made continuously, it is also acceptable that the reduction thereof is made stepwise. Moreover, instead of the reduction of the width of the resistive line, it is also appropriate that the resistivity of the conductive plate 15 is increased continuously or stepwise in the direction of departing from the one end 150.

(Sixth Modification of Second Embodiment)

Figure 14:
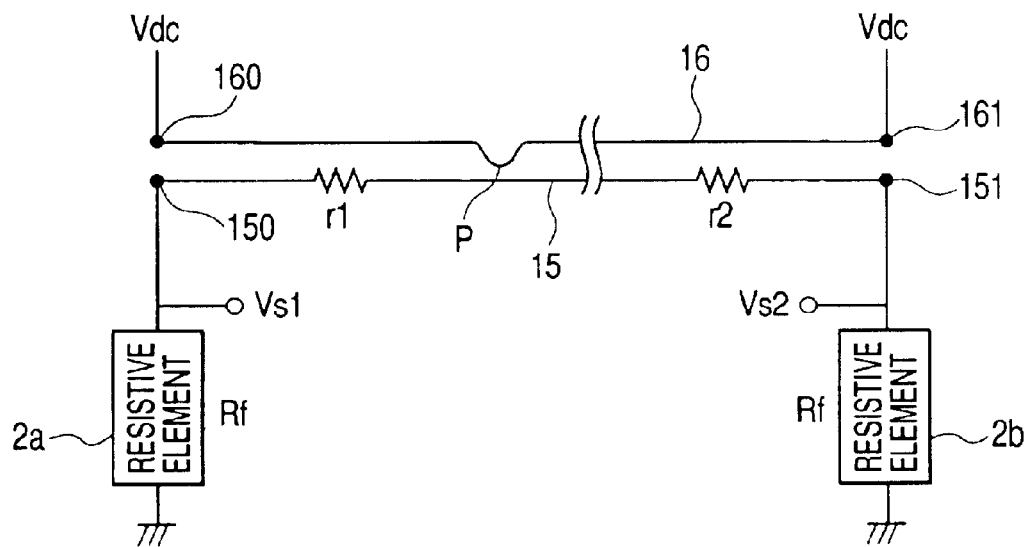
FIG. 14 is an illustration of a circuit arrangement according to a modification of the apparatus shown in FIG. 9.

Referring to FIG. 14, a description will be given hereinbelow of a sixth modification of the second embodiment.

As shown in FIG. 14, as compared to the configuration shown in FIG. 9, in this sixth modification, the other end 151 of the conductive plate 15 forming a resistive line is grounded through a resistive element 2b, and the collision site detection is made on the basis of a voltage drop Vs1 of the resistive element 2a and a voltage drop Vs2 of the resistive element 2b. In this connection, it is also appropriate that a high direct-current potential Vdc is applied to the other end 161 of the conductive plate 16 forming an electrode line as shown in FIG. 14.

In this case, since the voltage drop Vs1 is determined by the ratio of the resistance r1 of the resistive line 15 between the collision point P and the one end 150 and the resistance Rf of the resistive element 2a, while the voltage drop Vs2 depends on the ratio of the resistance r2 of the resistive line 15 between the collision point P and the other end 151 and the resistance Rf of the resistive element 2b, a collision at one end side of the vehicle can be detected on the basis of the signal voltage Vs1 with high sensitivity, and a collision at the other end side thereof can be detected on the basis of the signal voltage Vs2 with high sensitivity.

Figure 15:
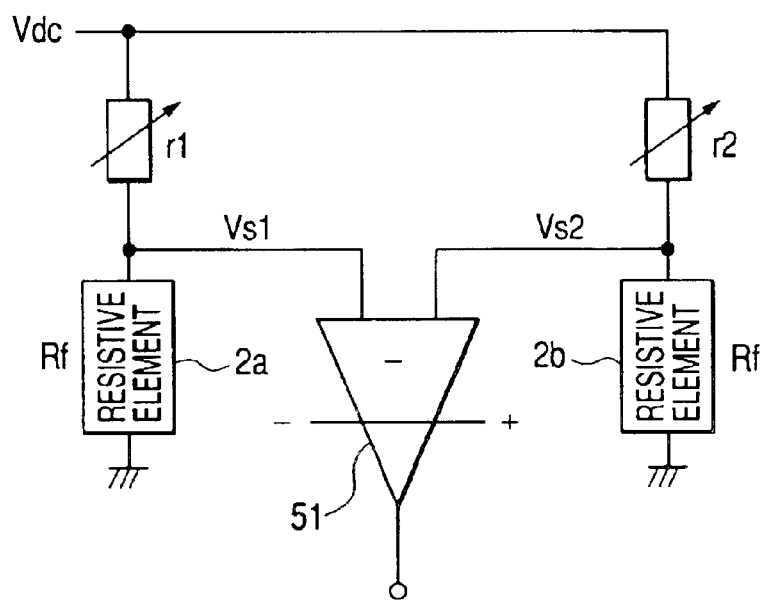
FIG. 15 is a circuit diagram useful for explaining an example of signal processing in the circuit shown in FIG. 14.

Referring to FIG. 15, a description will be given hereinbelow of an example of signal processing using the signal voltages Vs1 and Vs2 as variable parameters.

In FIG. 15, a voltage (Vs1−Vs2) forming a difference between the signal voltages Vs1 and Vs2 is obtained through the use of an operational amplifier subtracter circuit 51, and a collision site is determined on the basis of a variation of this difference voltage (Vs1−Vs2). Thus, in the case of a collision at one end side of the vehicle, the difference voltage (Vs1−Vs2) takes a positive-side maximum value, and in the case of a collision at a central portion of the vehicle, the difference voltage (Vs1−Vs2) becomes zero, and in the case of a collision at the other end side of the vehicle, the difference voltage (Vs1−Vs2) takes a negative-side maximum value. Therefore, as compared to the circuit arrangement shown in FIG. 9, a higher linearity is obtainable over the entire region.

(Seventh Modification of Second Embodiment)

Figure 16:
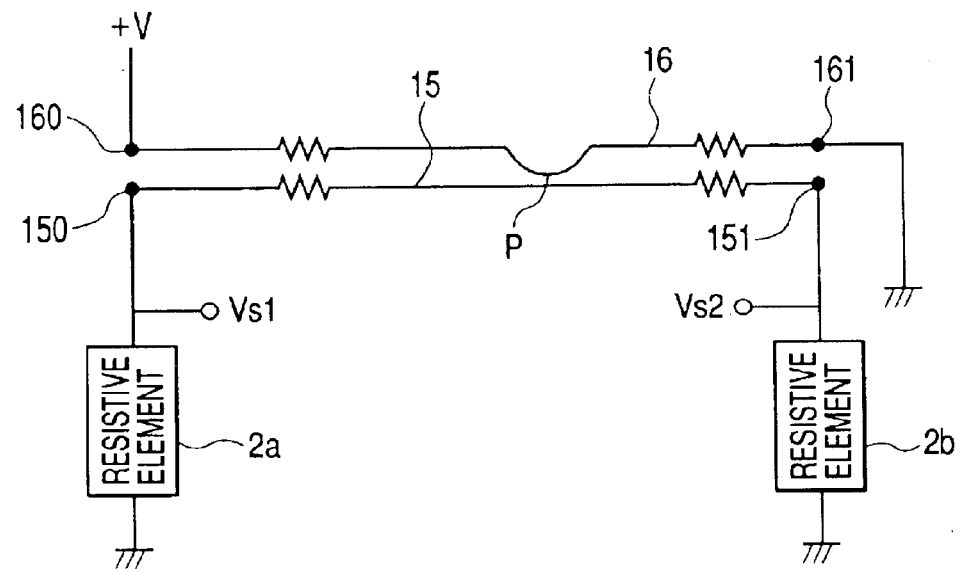
FIG. 16 is an illustration of a circuit arrangement according to a modification of the apparatus shown in FIG. 9.

Referring to FIG. 16, a description will be given hereinbelow of a seventh modification of the second embodiment.

As shown in FIG. 16, as compared to the configuration shown in FIG. 14, in this seventh modification, each of the conductive plates 15 and 16 is formed as a resistive line and the other end 161 of the conductive plate 16 is grounded to detect the ratio of the signal voltage Vs1 and the signal voltage Vs2.

This can improve the linearity of the signal voltages, as compared to the arrangement in which each of the conductive plates 15 and 16 is formed as a resistive line and the one end 150 of the conductive plate 15 is grounded through the resistive element 2a instead of grounding the other end 161 of the conductive plate 16 so as to detect the signal voltage Vs1 forming a voltage drop of the resistive element 2a.

Figure 17:
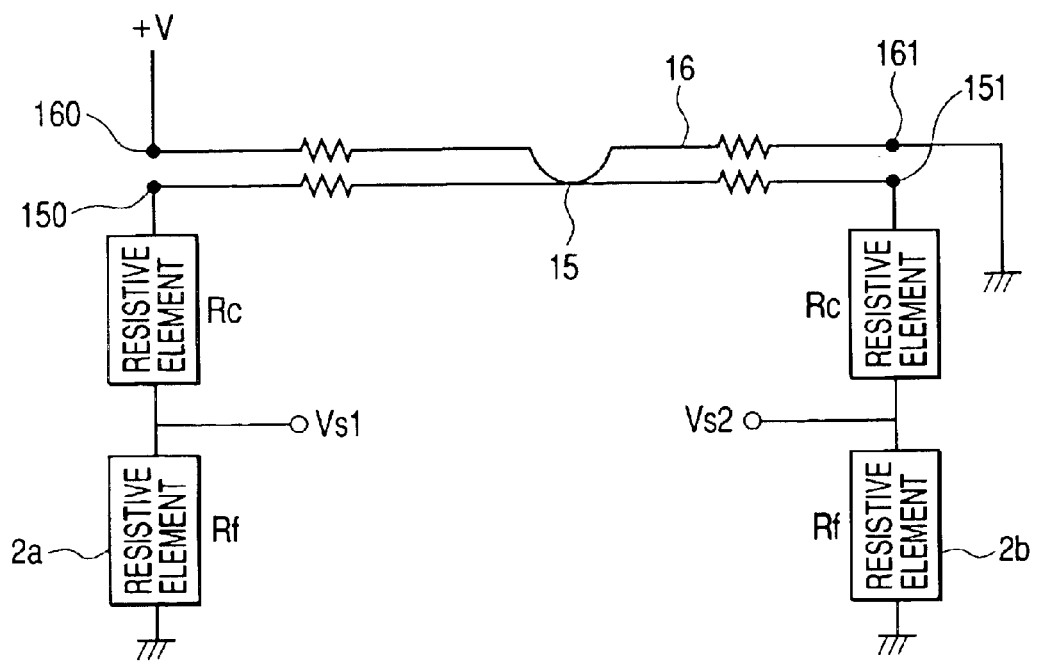
FIG. 17 is an illustration of a circuit arrangement according to a modification of the apparatus shown in FIG. 16.
Figure 18:
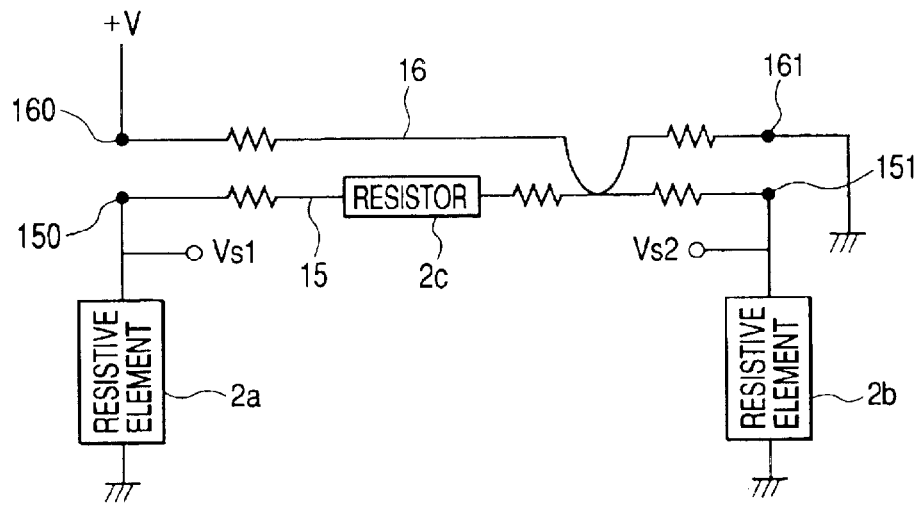
FIG. 18 is an illustration of a circuit arrangement according to a modification of the apparatus shown in FIG. 16.

In this connection, in this modification, if auxiliary resistors (resistive elements) Rc are added as shown in FIG. 17, it is possible to further improve the linearity of the signal voltage. Moreover, if a resistor 2c having a high resistance is put in a central portion of the conductive plate 15 or 15 as shown in FIG. 18, the linearity of the signal voltage is similarly improvable.

(Third Embodiment)

Figure 19:
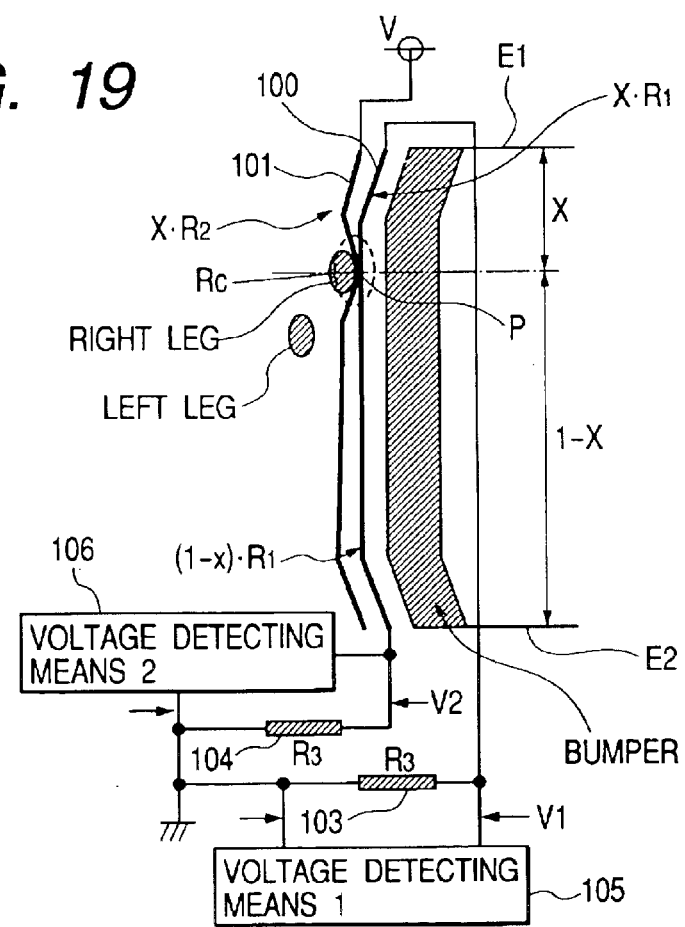
FIG. 19 is an illustration of an circuit arrangement of a vehicle collision position detecting apparatus according to a third embodiment of the present invention.

Referring to FIG. 19, a description will be given hereinbelow of a collision position (site) detecting apparatus according to a third embodiment of the present invention. In this apparatus, conductive lines 100 and 101 are provided as the above-mentioned conductive plates, and the conductive line 101 has an elasticity and comes into contact with the conductive line 100 at a collision and, when released from the collision, separates from the conductive line 100 due to its elasticity.

In FIG. 19, the conductive line 100 is a resistive line having a resistivity R1, while the conductive line 101 is a resistive line having a resistivity R2. In the illustration, the contact resistance value in a case in which the conductive lines 100 and 101 come into contact with each other is expressed by Rc, and in this embodiment, the contact resistance value Rc is considered to be zero. The aforesaid "resistivity" signifies an electrical resistance per unit distance in the lateral directions of a vehicle.

A direct-current supply voltage V is applied to one end portion of the conductive line 101, while one end portion of the conductive line 100 is grounded through a resistive element 103 having a resistance value R3, and the other end portion of the conductive line 100 is grounded through a resistive element 104 having a resistance value R3. A voltage detecting means 105 constituting a portion of the detection circuit unit 2 (see FIG. 1) detects a voltage drop V1 across the resistive element 103, while a voltage detecting means 106 constituting a portion of the detection circuit unit 2 detects a voltage drop V2 across the resistive element 104.

In the illustration, P represents an actual collision position, X designates a true distance from the one end portion E1 of the conductive line 100, to which the direct-current supply voltage V is applied, to the collision point P, and 1−X denotes a true distance from the other end portion E2 of the conductive line 100, to which the direct-current supply voltage V is not applied, to the collision position P. Therefore, the resistance value between E1 to P of the conductive line 100 becomes X·R1, and the resistance value between E1 to P of the conductive line 101 becomes X·R2, and the resistance value between E2 to P of the conductive line 100 becomes (1−X)·R2. The distance X can be calculated as a function of one of or both the voltage drops V1 and V2 as will be mentioned below.

In the case of using the voltage drops V1 and V2, the distance X (X1) can be calculated according to the following equation (3).

$$X1 = \frac{(R1 + R3)V2 - R3V1}{(V1 + V2)R1} \quad (3)$$

The distance X calculated according to this equation (3), that is, the distance X calculated using only the voltage drops V1 and V2, will be referred to as a "calculated distance X1".

Moreover, the distance X can also be calculated using only the voltage drop V1 according to the following equation (4).

$$X2^2 - \frac{(R1^2 + R1R2 + 2R2R3)V1 + R1R3V}{R1^2V1} \quad (4)$$

$$X2 - \frac{(R1R3 + R3^2)V1 - (R1R3 + R3^2)V}{R1^2V1} = 0$$

The distance X calculated according to this equation (4), that is, the distance X calculated using only the voltage drop V1, will be referred to as a "calculated distance X2".

Still moreover, the distance X can be calculated using only the voltage drop V2 according to the following equation (5).

$$X3^2 - \frac{(R1^2 + R1R2 + 2R2R3)V2 - R3^2V}{R1^2V2} \quad (5)$$

$$X3 - \frac{(R1R3 + R3^2)V2 - R3^2V}{R1^2V2} = 0$$

The distance X calculated according to this equation (5), that is, the distance X calculated using only the voltage drop V2, will be referred to as a "calculated distance X3".

Figure 20:
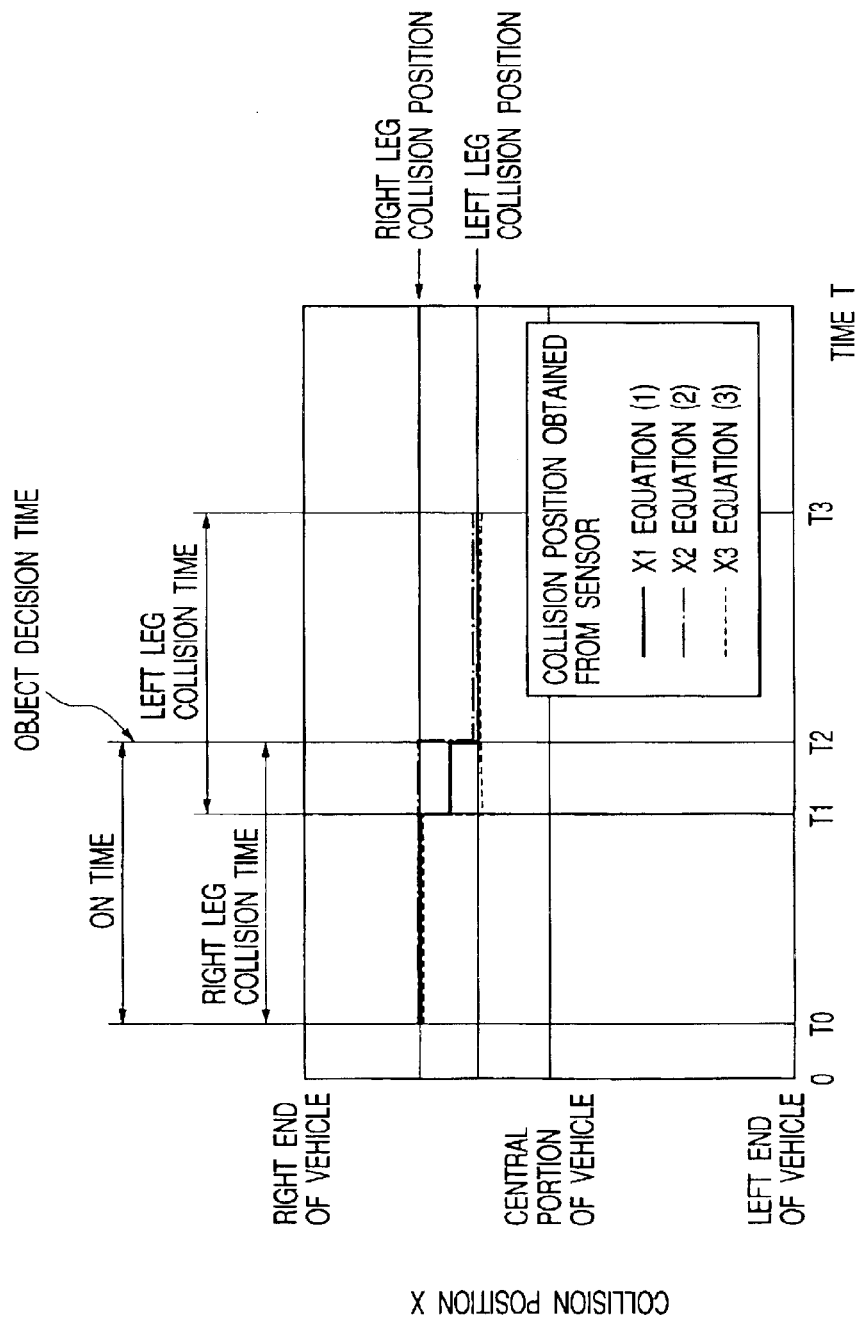
FIG. 20 is an illustration of output variations in the apparatus shown in FIG. 19.

FIG. 20 is an illustration of the transition of the aforesaid calculated distance X1, X2, X3 with the passage of time when a pedestrian falls into a colliding condition as shown in FIG. 19.

In FIG. 20, T0 represents the time at which the right leg collides against the bumper (line sensor), and T1 depicts the time at which the left leg collides against the vehicle and, at this time, the right leg remains in the colliding condition. Moreover, T2 denotes the time at which the right leg is thrown up and is separated from the line sensor, and T3 signifies the time at which the left leg is thrown up and is separated from the line sensor.

As seen from FIG. 20, the calculated distance X1 based on the voltage drops V1 and V2, the calculated distance X2 based on the voltage drop V1 and the calculated Distance X3 based on the voltage drop V2 show unique positions for the period of time from the time T1 to the time T2, i.e., when the conductive lines 100 and 101 come into contact with each other at two points. If two of these distances X1, X2 and X3 are used, the detection can be made while discriminating the time T2 from the time T1. This time T2 is the time at which the leg which has first collided against the bumper is thrown up but the other leg remains in the colliding condition. Therefore, a decision can be made that the vehicle has collided against a pedestrian, even if one leg is in a colliding condition. The reason that the detected position at the time T1 is not used for the pedestrian decision is that a collision object other than a pedestrian can also provide such variations in X1 to X3.

(First Example of Setting Appropriate Resistance Value)

As mentioned above, the equation (3) signifies that the collision position X is calculated as a function of V1, V2 and R3/R1, and R3/R1 is an essential parameter for the position decision, while each of the equations (4) and (5) signifies that the collision position is calculated as a function of V1, V2, R1, R2 and R3. In this embodiment, X takes a value from 0 to 1, and X=0 represents that a collision occurs at a voltage applied end portion (right-side end or left-side end) while X=1 represents that a collision occurs at a voltage non-applied end portion. Therefore, if the overall length of each of the conductive lines 100 and 101 in the lateral directions of the vehicle (in the right- and left-hand directions of the bumper) is taken as L (in this case, 1200 mm), the actual length from a reference end for a collision position is given by XL. For example, in the case of X=0.3, XL becomes 360 mm, which signifies that the distance X from the voltage applied end portion E1 is 360 mm. In the following description, R3 depicts a resistance value of a resistive element for detection of a voltage drop, R1 denotes a resistance value of one conductive line connected to the resistive element, and R2 indicates a resistance value of the other conductive line. For simplicity of equations only, let it be assumed that the contact resistance value between the two conductive lines is ignorable.

Figure 21:
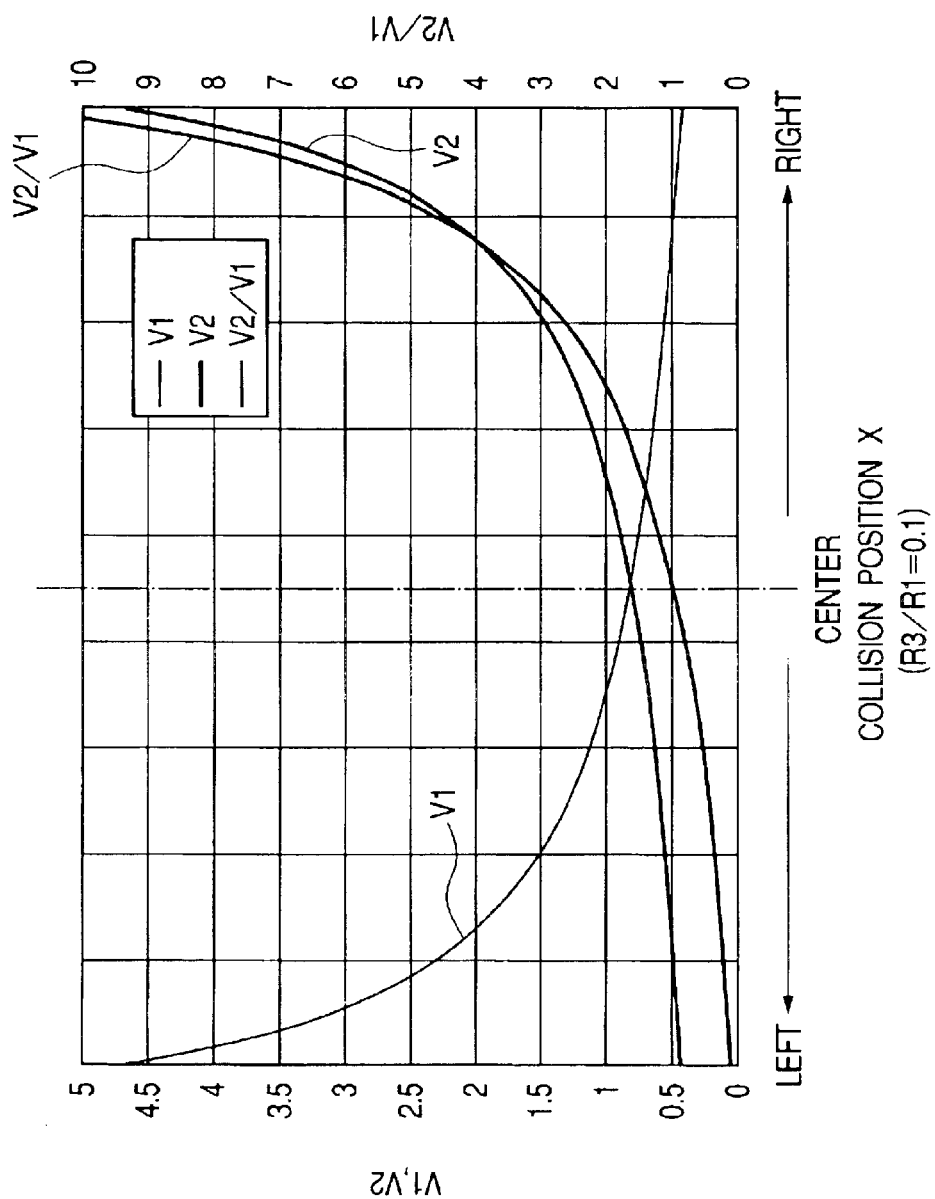
FIG. 21 is a characteristic illustration of the relationship between a collision position and an output voltage of a line sensor (R3/R1=0.1) in the case of the circuit shown in FIG. 19.

FIG. 21 shows the relationship between a distance X and V1, V2, V2/V1 in a case in which the resistance ratio R3/R1 is set at 0.1. This relationship can be acquired from the following equations (6) and (7) obtained by substituting R3/R1=0.1 into the equations (4) and (5).

$$V1 = \frac{\{(1-X)R1 + R3\}R3}{(XR1 + R3)\{(1-X)R1 + R3\} + (XR2 + Rc)(R1 + 2R3)}V \quad (6)$$

$$V2 = \frac{(XR1 + R3)R3}{(XR1 + R3)\{(1-X)R1 + R3\} + (XR2 + Rc)(R1 + 2R3)}V \quad (7)$$

As seen from FIG. 21, if the collision position exists on the right side with respect to the central portion, the inclination of the voltage V1 becomes small, and if the collision position exists on the left side with respect to the central portion, the inclination of the voltage V2 becomes small. Assuming that the voltage is read at an equal interval with a set resolution, the resolution becomes high at the large inclination portion while the resolution becomes low at the small inclination portion. Therefore, in a case in which R3/R1 is 0.1 as shown in FIG. 21, it is found that the resolution is low.

Figure 22:
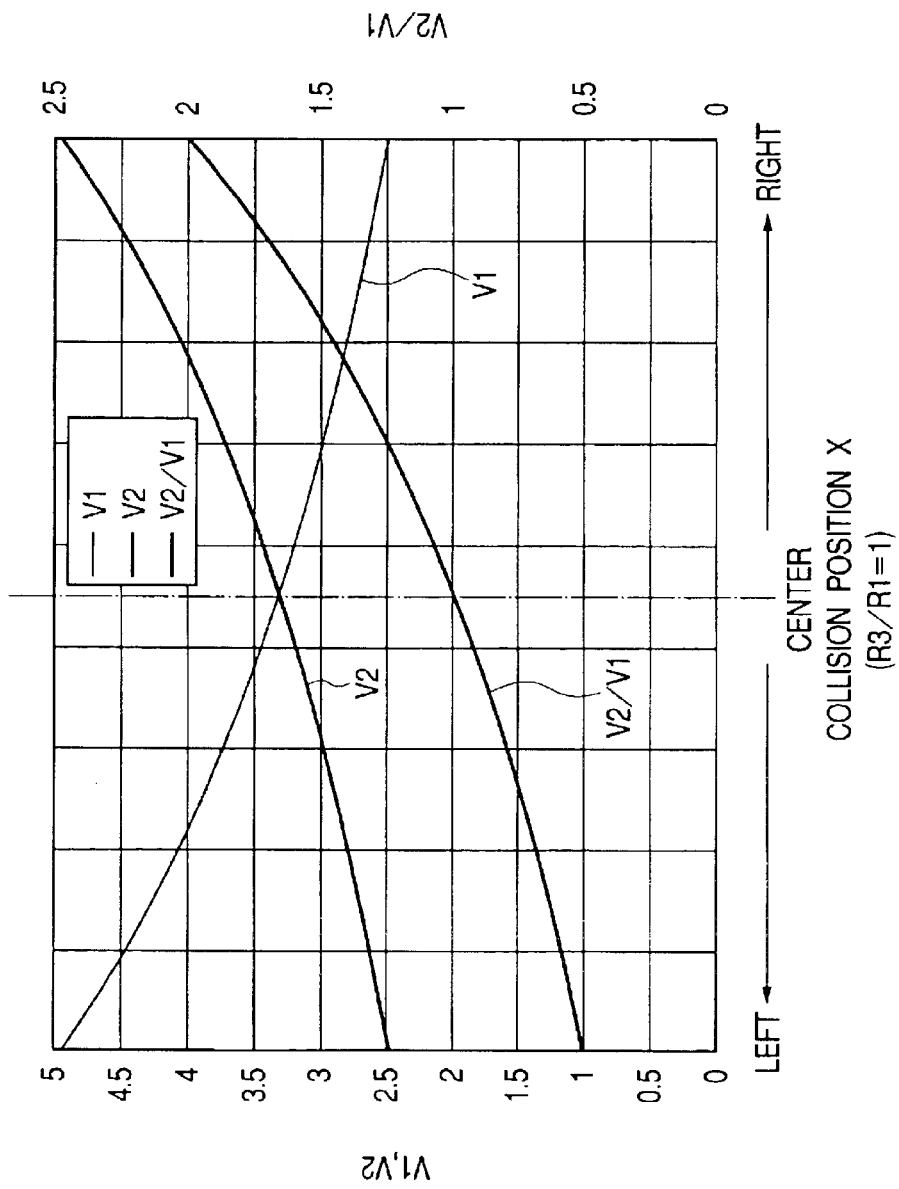
FIG. 22 is a characteristic illustration of the relationship between a collision position and an output voltage of a line sensor (R3/R1=1) in the case of the circuit shown in FIG. 19.

FIG. 22 shows the relationship between the distance X and V1, V2, V2/V1 in a case in which the resistance ratio R3/R1 obtained in like manner is 1. As obvious from FIG. 22, the rate of change of each of V1, V2 and V2/V1 with respect to the distance X is uniformized, and the position detection resolution becomes high irrespective of the collision position.

Secondly, a description will be given hereinbelow of a collision against human legs.

It can be considered that the size of the human leg is approximately 50 to 150 mm and the leg stands straight and, hence, the right and left legs collide at different timings when the spacing between the centers of both the legs is more than 100 mm. Therefore, in a case in which both the legs are separated from each other by 100 mm or more at a collision, there is a need to make a decision on a pedestrian on the basis of the voltage transition shown in FIG. 20. Accordingly, if the detection is made while discriminating between the right and left legs separated from each other, it is required that the position detection accuracy of the detection circuit unit 2 be below 50 mm.

If the resolution of an A/D converter forming an input stage of the detection circuit unit 2 is set to be high, the aforesaid satisfactory resolution is naturally attainable even in the cases shown in FIGS. 21 and 22. However, the high resolution of the detection circuit unit 2 causes a considerable increase in calculation burden of the signal processing section (usually, software processing in a microcomputer) of the detection circuit unit 2 and, in consequence, not only the cost of the detection circuit unit 2 increases, but also the time needed for the pedestrian decision is prolonged.

(Resistance Setting Method)

A description will be given hereinbelow of a method of setting an optimum resistance value.

The poorest resolution resides at the right and left end portions of the conductive line where the smallest V1 and V2 inclinations appear. For this reason, it is preferable to find a combination of resistance values at which the resolution satisfies the desired value "50 mm". That is, it is preferable that a difference between V2 at X=0 and V2 in the case of a collision at a position separated by 50 mm therefrom exceeds the voltage resolution.

Furthermore, assuming that X is a value from 0 to 1 and the value of V2 at the end portion of the conductive line is taken as V2(0), since X is 0, the equation (7) becomes the following equation (8).

$$V2(0) = \frac{R3^2}{(R3(R1 + R3)}V \quad (8)$$

Moreover, when the value of V2 at a position separated by a very short distance dx from this end portion E1 of the conductive line is taken as V2(dx), the equation (7) turns to the following equation (9).

$$V2(dx) = \frac{(dxR1 + R3)R3}{(dxR1 + R3)\{(1-dx)R1 + R3\} + dxR2(R1 + 2R3)}V \quad (9)$$

Thus, when the input voltage read resolution of the detection circuit unit 2 is taken as n, if the following equation (10) is satisfied, the resolution is attainable.

$$V2(dx) - V2(0) \le \frac{V}{2^n} \quad (10)$$

Figure 23:
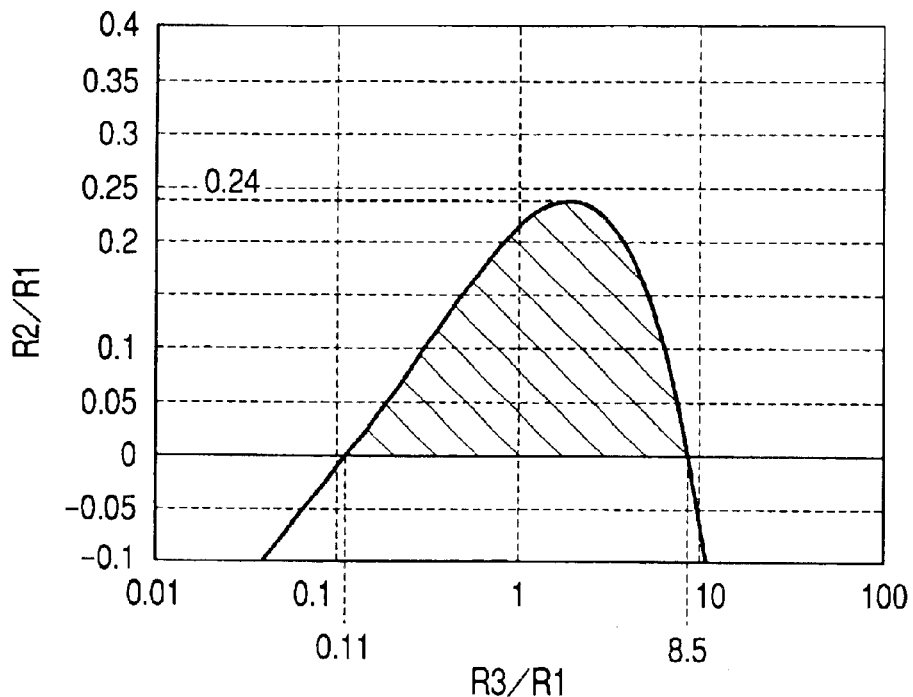
FIG. 23 is an illustration of a resistance ratio range which provides a required resolution, according to the third embodiment.
Figure 24:
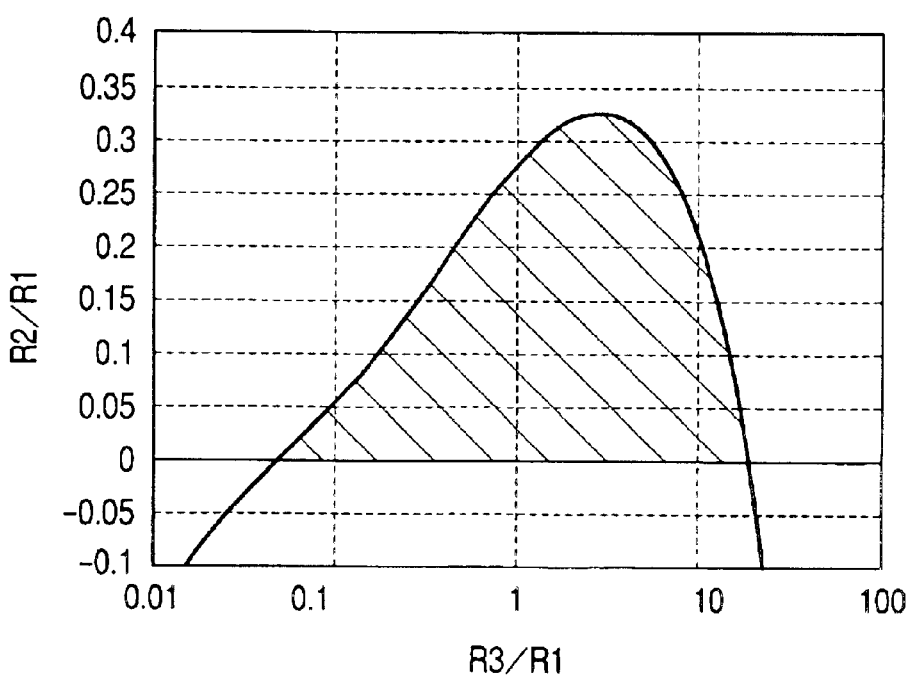
FIG. 24 is an illustration of a resistance ratio range which provides a required resolution, according to the third embodiment.

Therefore, a resistance ratio range is determined to satisfy the equation (10). Furthermore, if the equations (8) and (9) are substituted into the equation (10), the aforesaid equation (1) is obtainable. Accordingly, a resistance ratio range can be determined to satisfy the equation (1). For example, assuming that dx is set at value ¹⁄₂₄ obtained by dividing the minimum decision distance "50 mm" by the sensor installation range "L=1200 mm", if the input voltage read resolution of the detection circuit unit 2 is set at 8 bits, the range in which V1 given by the equation (6) resides becomes a portion indicated by oblique lines in FIG. 23. That is, the collision position detection resolution "50 mm" is attainable in this range indicated by the oblique lines. Moreover, when the voltage read resolution of the detection circuit unit 2 is set at 9 bits, the range in which V1 given by the equation (6) resides becomes a portion indicated by oblique lines in FIG. 24. That is, the collision position detection resolution "50 mm" is attainable in this range indicated by the oblique lines. The oblique line indicated portions in FIGS. 23 and 24 signifies a resistance ratio range in which two collision points separated by 100 mm from each other are discriminable from each other.

(Fourth Embodiment)

Although in the above-described third embodiment the assumption is made that the contact resistance Rc is very low, a description will be given hereinbelow of a method of setting a resistance ratio to secure the resolution even if the contact resistance between the conductive lines is high.

In this case, Rc is added to the equations (8) and (9) to obtain a resistance ratio range which satisfies the equation (10). The range of the resistance ratio R2/R1 is given by the above-mentioned equation (2). That is, $$0 < \frac{R2}{R1} < \frac{F(S)+G(S)}{H(S)} = T'$$

$F(S)=2^n S[(dx+S)\{(1+S)S+(1+2S)C\}-S\{(dx+S)(1-dx+S)+(1+2S)C\}]$ $G(S)=-\{S(1+S)+C(1+2S)\}\{(dx+S)(1-dx+S)+(1+2S)C\}$ $H(S)=\{S(1+2^n S)+C(1+2S)\}(1+2S)dx$ $$S = \frac{R3}{R1}$$

$$C = \frac{Rc}{R1}$$

where dx: required resolution/sensor installation width n: voltage read resolution multiplier (number of bits)

Figure 25:
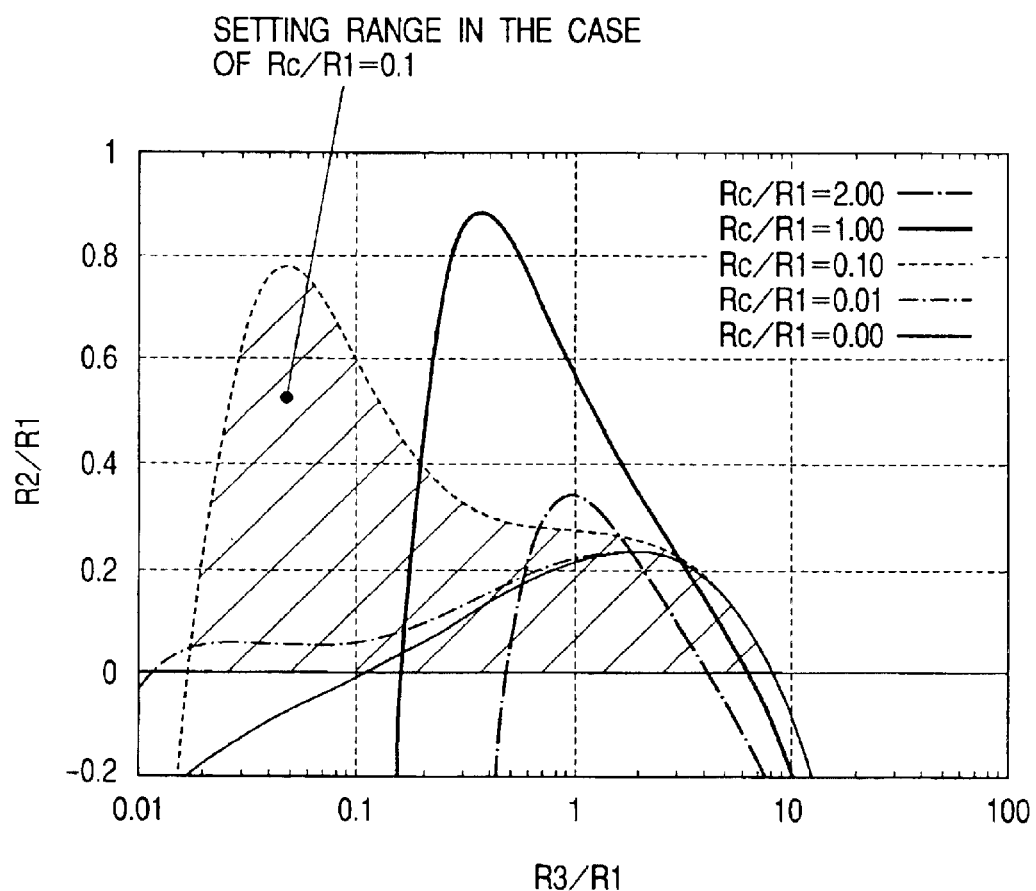
FIG. 25 is an illustration of a resistance ratio range which provides a required resolution, according to a fourth embodiment according to the present invention.

A resistance ratio range in the case of the input voltage read resolution of the detection circuit unit 2 being set at 8 bits is indicated by oblique lines in FIG. 25. In FIG. 25, when Rc/R1 is below 1, the range generally includes the range (see FIG. 23) defined in the third embodiment. Therefore, the range (see FIG. 23) in the third embodiment is effective when Rc/R1 is below 1, and the range (see FIG. 23) in the third embodiment is usually employed. However, in a case in which the contact resistance is known in advance, it is preferable to set the resistance ratio in a range which satisfies the equation (2), for that the setting ranges of R1, R2 and R3 vary.

(Fifth Embodiment)

Figure 26:
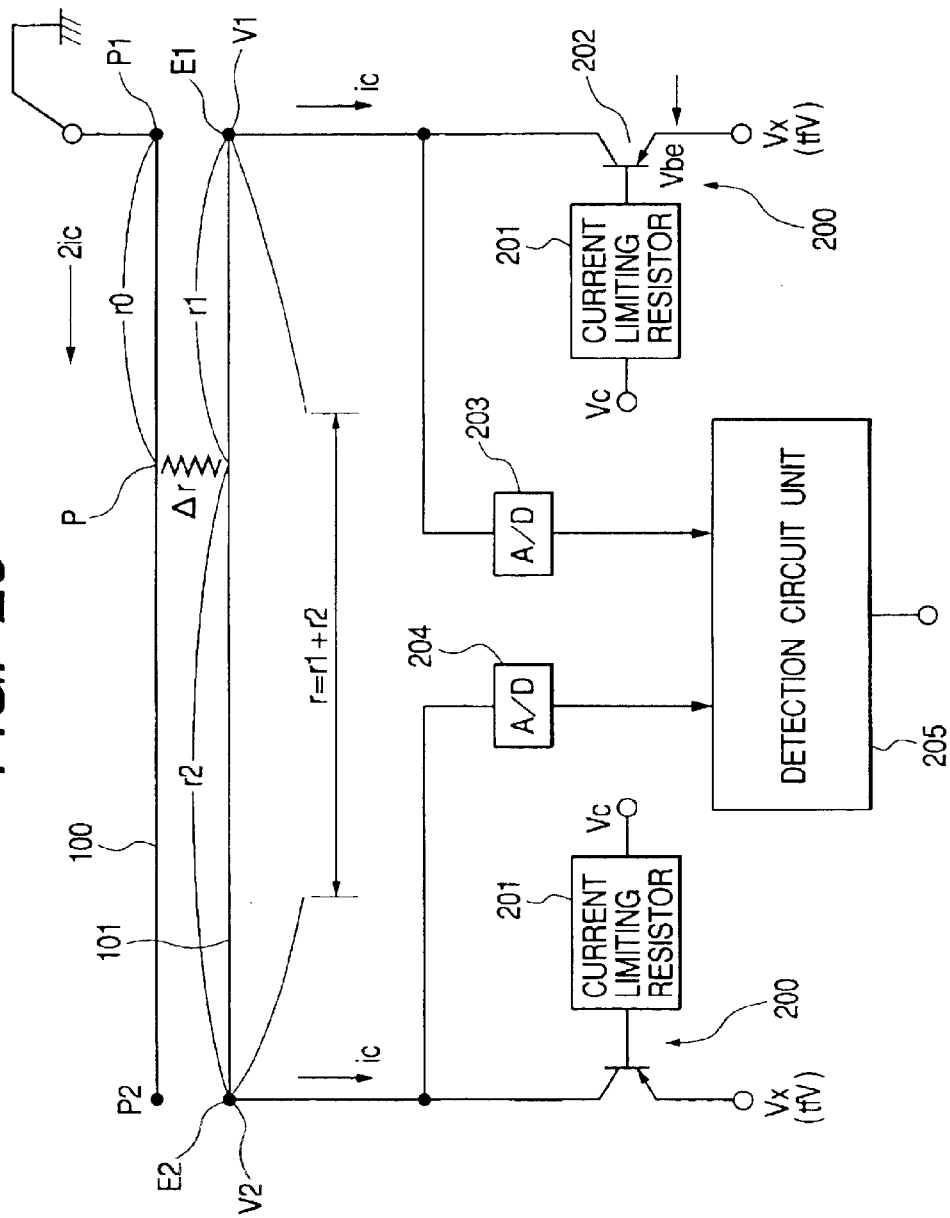
FIG. 26 is an illustration of an circuit arrangement of a vehicle collision position detecting apparatus according to a fifth embodiment of the present invention.
Figure 27:
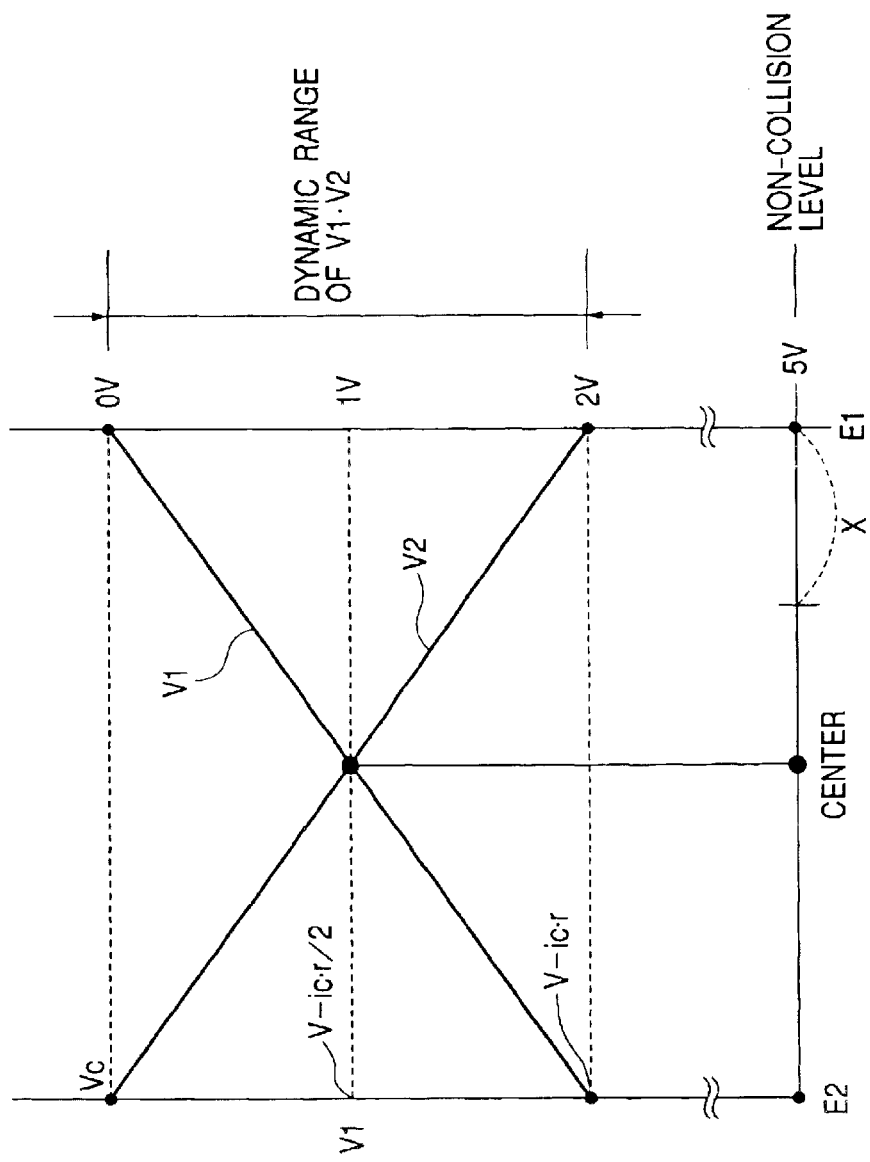
FIG. 27 is a characteristic illustration of the relationship between a collision position and an output voltage of a line sensor in the case of the circuit shown in FIG. 26.

Referring to FIG. 26, a description will be given hereinbelow of a collision position detecting apparatus according to a fifth embodiment of the present invention. In this embodiment, the conductive line 100 is placed on the power supply connection side, while the conductive line 101 is placed on the voltage detection side. FIG. 27 is a characteristic illustration of the relationship between a collision position and an output voltage of a line sensor in the case of the circuit shown in FIG. 26.

In FIG. 26, P represents a collision point, and the conductive lines 100 and 101 come into contact with each other in a state where the contact resistance is zero. The right-hand end portion of the conductive line 100 is grounded, and constant-current circuits 200 are connected to both the ends of the conductive line 101. Each of the constant-current circuits 200 comprises a PNP transistor 202 to which a constant voltage Vc is applied through a current limiting resistor 201 having a high resistance value and to which a constant voltage Vx (in this case, 5V) is applied through its emitter. Incidentally, it is also acceptable that an emitter resistor having a predetermined resistance is added to the emitter of the transistor 202. In this embodiment, since the conductive line 100 is grounded, the leakage from the conductive line 100 to the vehicle body is ignorable even in case of rain. In this case, although there is a need to apply a minus voltage to the emitter of the transistor 202, the employment of the transistor permits the application of a plus voltage to the emitter, and this is advantageous.

For example, a direct-current voltage is applied to a series circuit comprising a resistive element and a constant-voltage diode and the voltage at the junction between the resistive element and the constant-voltage diode is current-amplified through the use of a voltage follower operational amplifier circuit or the like. Naturally, in addition to the above-mentioned constant current circuit, it is also possible to employ various types of higher-quantity constant current circuits using an operational amplifier.

Furthermore, in FIG. 26, numerals 203 and 204 designate A/D converters, and numeral 205 represents a microcomputer based detection circuit unit. The voltages V1 and V2 at both the end portions of the conductive line 101 are converted through the A/D converters 203 and 204 into digital signals and are read by the detection circuit unit 205. A description will be given hereinbelow of a method of calculating a collision position according to this embodiment.

(Non-Collision State)

In a non-collision state, the transistors 202 are in a saturated condition and their collector voltages V1 and V2 are substantially equal to the emitter voltage Vx (for example, 5V). Therefore, if r·ic is set at 2V, a decision is made as to whether or not the voltages V1 and V2 are higher than 3V, and if the voltages V1 and V2 are higher than 3V, a decision is made as an non-collision state.

(First Collision State)

First, a description will be given hereinbelow of a case in which only one leg of a pedestrian collides against one point of the conductive line. The overall resistance of the conductive line 101 is set to be r=r1+r2 where r1 represents a resistance value of the conductive line 101 from a collision point P to the end E1 and r2 denotes a resistance value of the conductive line 101 from the collision point P to the end E2. Moreover, in the illustration, r0 depicts a resistance value of the conductive line 100 from the end E1 to the collision point P and Δr represents a contact resistance value. Incidentally, it is also acceptable that the conductive line 100 is constructed with a copper band or the like and the resistance value is ignored. The current flowing in the constant-current circuit unit 200 is ic, the following equations are obtainable.

$r=r1+r2$ $V1=(2(r0+\Delta r)+r1)ic$ thus, $2(r0+\Delta r)=-r1+V1/ic$ $V2=(2(r0+\Delta r)+r2)ic=(-r1+V1/ic+r2)$ thus, $V2/ic=r2-r1+V1/ic$ $V1/ic=V2/ic+r1-r2$ $(V1-V2)/ic=r1-r2=r1-(r-r1)=2r1+r$ accordingly, $r1=(r+(V1-V2)/ic)/2$ $r2=(r+(V2-V1)/ic)/2=r-r1$ In this case, since r1 is in proportion to the distance from the right-side end E1 of the conductive line 101 to the collision point P, it is possible to determine the collision point P on the basis of r1. Similarly, since r2 is in proportion to the distance from the left-side end E of the conductive line 101 to the collision point P, it is possible to determine the collision point P on the basis of r2. The key point is that, since r1 and r2 obtained in this way do not include the contact resistance Δr and the resistance r0 of the conductive line 100, the collision point P can accurately be calculated as a function of V1 and V2 regardless of the variations of the contact resistance Δr and the resistance r0 of the conductive line 100.

(Second Collision State)

When the other leg of the pedestrian collides thereafter, the collision occurs at two points, and the above-mentioned $r2=(r+(V2-V1)/ic)/2=r-r1$ becomes remote from the satisfaction. This enables making a decision that a collision has occurred in two points or a large area.

(Third Collision State)

Following this, if, of both the legs of the pedestrian, the leg first subjected to the collision is thrown up and is separated from the conductive line 100, a state similar to the above-mentioned first collision state develops. However, the position of the collision point P differs from the collision position in the first collision state.

Therefore, when the collision state shifts from the first collision state through the second collision state to the third collision state as in the case of the above-described third embodiment, the decision can be made that the collision object is a pedestrian.

(Fourth Collision State)

Moreover, it can also be considered that a vehicle collides simultaneously against both the legs of a pedestrian and both the legs are simultaneously thrown up. In this case, $r0+\Delta r$ is set at zero for simplicity.

$$r=r1+r2$$

$$V1=r1 \cdot ic$$

thus, $$r1=V1/ic$$

$$V2=r2 \cdot ic$$

thus, $$r2=V2/ic$$

In the case of the simultaneous collision of both the legs, the sum of r2 and r1 obtained in this way becomes lower than the previously known overall resistance r of the conductive line 101, and $r-(r1+r2)$ becomes equal to the distance or width between the two collision points. If this distance is in a usual range of both the legs, a decision can be made that the collision object is a pedestrian. On the other hand, if the distance is out of the range, the decision can immediately be made that it is a thing other than a pedestrian.

(Fifth Collision State)

Still moreover, it can also be considered that a vehicle collides one leg or simultaneously collides both legs of a pedestrian and the one leg is thrown up or both the legs are simultaneously thrown up. In this case, a decision is first made that a collision has occurred, and if the one leg or both the legs put in order are thrown up to cancel the collision state before the elapse of a predetermined period of time (a threshold time linked with a vehicle speed), a decision can be made that it is a pedestrian.

(Modification)

Although in the above-described embodiments the application of a supply voltage is made at all times, it is also appropriate that a pulse voltage is regularly applied so as to save the power dissipation.

Moreover, it is also appropriate to apply an alternating-current voltage. In this case, even if the contact between the conductive lines 100 and 101 at the collision side P is poor and the contact resistance becomes high, since the electrostatic capacity between the conductive plates 15 and 16 at this site at the collision becomes extremely large, they falls substantially into a collision condition in the case of the alternating current, the detection is feasible in like manner.

Still moreover, in the case of the employment of the alternating current, it is also possible that the low-resistance conductive plate 16 in the fifth embodiment is not used and the ground connected through a pedestrian or an obstacle is used instead. That is, in a case in which a pedestrian collides at the point P, it can be considered that the grounding virtually occurs due to a large electrostatic capacity of the pedestrian, and the decision on a pedestrian can be made on the basis of the voltages V1 and V2 as in the case shown in FIG. 26.

In addition, it is also appropriate that, prior to the detection of a collision according to the above-mentioned methods, the resistance of the base current limiting resistor 201 is set at a high value to save the power dissipation and, for the detection of a collision, the resistance of the base current limiting resistor 201 is switched to a low value through the use of a resistance switching circuit to increase the constant current ic for enhancing the detection accuracy.

It should be understood that the present invention is not limited to the above-described embodiments, and that it is intended to cover all changes and modifications of the embodiments of the invention herein which do not constitute departures from the spirit and scope of the invention.

What is claimed is:

1. A pedestrian collision protection system for a vehicle, comprising:

a collision detecting element fixedly secured to a bumper of a vehicle for detecting a collision against a pedestrian;

a collision site detecting element for detecting a position of a collision site in lateral directions of said vehicle; and a pedestrian protecting element provided in said vehicle for protecting said pedestrian from the collision according to a pedestrian collision site in said lateral directions at a collision against the pedestrian on the basis of outputs of said pedestrian collision detecting element and said pedestrian collision site detecting element, wherein said collision detecting element also functions as said collision site detecting element, and includes:

a line sensor composed of a plurality of conductive lines which are separated from each other by a predetermined spacing to confront each other and come into contact with each other when a collision against the pedestrian occurs; and a detection circuit unit made to carry out the collision detection and the collision site detection on the basis of a variation of quantity of electricity related to an impedance between said plurality of conductive lines.

2. The system according to claim 1, wherein said line sensor includes a plurality of pairs of conductive lines successively arranged in a longitudinal direction of said bumper to detect the collision with the pedestrian independently of each other, and said detection circuit unit makes a decision indicative of the occurrence of a collision when detecting that at least two conductive lines constituting each of said conductive line pairs are brought into contact with each other due to the collision, and makes a decision on a collision site on the basis of a location of the contact-made conductive line pair which have come into contact with each other.

3. The system according to claim 1, wherein said line sensor includes a pair of conductive lines placed to extend in a longitudinal direction of said bumper and confront each other in a state separated from each other by a predetermined spacing and made to come locally into contact with each other at a position of the collision with the pedestrian and its vicinities, and at least one of conductive lines constituting said conductive line pair includes a resistive line having a resistivity in a numerical range which allows the detection of a current or voltage drop according to the occurrence or non-occurrence of the contact therebetween, and said detection circuit unit detects the collision and the collision site in said lateral directions on the basis of a current flowing in said conductive line pair or a voltage drop in said conductive line pair.

4. The system according to claim 3, wherein said conductive line pair is composed of an electrode line made of a high-conductivity material and a resistive line made of a resistive material having a predetermined resistivity.

5. The system according to claim 3, wherein said conductive line pair are fixedly secured to one of outside and inside surfaces of said bumper.

6. The system according to claim 5, wherein one of said conductive lines is held by one of the other conductive line and said bumper in a state where an elastic member having an electrical insulating property is interposed therebetween.

7. The system according to claim 5, wherein one of said conductive lines has an elasticity whereby said conductive line is restorable to its original position and is locally deformed by the collision, and is held by one of the other conductive line and said bumper.

8. The system according to claim 5, wherein a power supply source applies a supply voltage through a predetermined voltage drop detection resistive element to between the same-side end portions of said conductive lines constituting said conductive line pair, and said detection circuit unit carries out the detection of the collision and collision site on the basis of a voltage drop across said voltage drop detection resistive element.

9. The system according to claim 4, wherein said electrode line is connected to a first predetermined electric potential source and both ends of said resistive line are connected through different voltage drop detection resistive elements to a second predetermined electric potential source, and said detection circuit unit makes a decision on the collision site on the basis of voltage drops across said voltage drop detection resistive elements.

10. A collision site detecting apparatus for a vehicle, comprising:

a line sensor including at least two conductive lines fixedly secured to one of a front surface and a rear surface of said vehicle and placed to extend in lateral directions of said vehicle in a state separated from each other by a predetermined spacing; and a detection circuit unit for detecting a quantity of electricity related to an impedance between predetermined positions of both said conductive lines, wherein at least one of both said conductive lines is made of a resistive material having a predetermined resistivity, and when a collision against a body occurs, the spacing between both said conductive lines is locally elastically reduced at a position of the collision and its vicinities so as to be restorable, and said impedance varies according to the collision position.

11. The apparatus according to claim 10, wherein an alternating-current voltage and a direct-current voltage are applied to said line sensor, and said detection circuit unit makes at least collision detection and collision site detection on the basis of a variation of quantity of electricity related to a direct-current component flowing in said line sensor and detects approach of an obstacle on the basis of a variation of quantity of electricity related to an alternating-current component flowing in said line sensor.

12. A collision position detecting apparatus for a vehicle, comprising:

a line sensor including first and second conductive lines fixedly secured onto a front surface or rear surface of said vehicle to extend in lateral directions of said vehicle and placed to be separated from each other by a predetermined spacing in longitudinal directions of said vehicle, with at least one of said conductive lines being elastically deformed at a position of a collision against a body to be restorable to make an electrical connection with the other conductive line;

a power supply source for applying a voltage to a predetermined position of said first conductive line;

a pair of voltage drop detection resistive elements individually connected between both end portions of said second conductive line and a predetermined constant-potential source; and a collision position detection circuit unit for discriminating a collision position obtained on the basis of voltage drops across both said resistive elements through the use of an n-bit digital signal, wherein, when an electrical resistance value per unit distance of said first conductive line in said lateral directions is taken as R1, an electrical resistance value per unit distance of said second conductive line in said lateral directions is taken as R2, an electrical resistance value of both said resistive elements is taken as R3, R3/R1 is expressed as S, a constant (required resolution/sensor installation width) is taken as dx, and a maximum allowable resistance ratio is taken as T, a resistance ratio (R2/R1) is set to be below T given by the following equation.

$$0 < \frac{R2}{R1} < \frac{(dx+S)\{2^n dxS - (1-dx) - 2S - S^2\}}{(1+2^n S)(1+2S)dx} = T$$

$$S = \frac{R3}{R1}$$

where dx: required resolution/sensor installation width
n: voltage read resolution multiplier (number of bits).

13. The apparatus according to claim 12, wherein, when a contact resistance of both said conductive lines at a collision is taken as Rc and Rc/R1 is expressed as C, a resistance ratio (R2/R1) of said conductive lines is set to be below T' given by the following equation.

$$0 < \frac{R2}{R1} < \frac{F(S) + G(S)}{H(S)} = T'$$

$F(S) = 2^n S[(dx+S)\{(1+S)S+(1+2S)C\} - S\{(dx+S)(1-dx+S)+(1+2S)C\}]$ $G(S) = -\{S(1+S)+C(1+2S)\}\{(dx+S)(1-dx+S)+(1+2S)C\}$ $H(S) = \{S(1+2^n S)+C(1+2S)\}(1+2S)dx$ $$S = \frac{R3}{R1}$$

$$C = \frac{Rc}{R1}$$

where dx: required resolution/sensor installation width
n: voltage read resolution multiplier (number of bits).

14. A collision position detecting apparatus for a vehicle, comprising:
- a line sensor including first and second conductive lines fixedly secured onto a front surface or rear surface of said vehicle to extend in lateral directions of said vehicle and placed to be separated from each other by a predetermined spacing in longitudinal directions of said vehicle, with at least one of said conductive lines being elastically deformed at a position of a collision against a body to be restorable to make an electrical connection with the other conductive line;
- a power supply source for applying a voltage to a predetermined position of said first conductive line;
- constant current circuit units individually connected between end portions of said second conductive line and a predetermined constant-potential source; and
- a collision position detection circuit unit for determining a collision position on the basis of voltage drops across said constant current circuit units.

15. The apparatus according to claim 14, wherein said collision position detection circuit unit detects a collision position on the basis of a difference in voltage drop between said constant current circuit units individually placed between both said end portions of said second conductive line and said predetermined constant-potential source.

* * * * *